(12) United States Patent
Hamberg

(10) Patent No.: US 7,340,214 B1
(45) Date of Patent: Mar. 4, 2008

(54) SHORT-RANGE WIRELESS SYSTEM AND METHOD FOR MULTIMEDIA TAGS

(75) Inventor: Max Hamberg, Vantaa (FI)

(73) Assignee: Nokia Corporation, Espoo (FI)

( * ) Notice: Subject to any disclaimer, the term of this patent is extended or adjusted under 35 U.S.C. 154(b) by 417 days.

(21) Appl. No.: 10/073,200

(22) Filed: Feb. 13, 2002

(51) Int. Cl.
*H04B 7/00* (2006.01)

(52) U.S. Cl. .................. 455/41.2; 455/552; 455/553.1; 455/412.1; 455/414.1; 370/238; 709/204

(58) Field of Classification Search ............... 455/41.2, 455/41.3, 552.1, 553.1, 412.1, 412.2, 414.1, 455/414.2; 370/238, 328; 709/204
See application file for complete search history.

(56) References Cited

U.S. PATENT DOCUMENTS

| | | |
|---|---|---|
| 5,493,692 A | 2/1996 | Theimer et al. |
| 5,606,617 A | 2/1997 | Brands |
| 5,668,878 A | 9/1997 | Brands |
| 5,696,827 A | 12/1997 | Brands |
| 5,749,081 A | 5/1998 | Whiteis |
| 5,790,974 A | 8/1998 | Tognazzini |

(Continued)

FOREIGN PATENT DOCUMENTS

AU  200135071  10/2001

(Continued)

OTHER PUBLICATIONS

Jaap Haartsen, "Bluetooth—The universal radio interface for ad hoc, wireless connectivity," Ericsson Review No. 3, 1998, pp. 110-117.

(Continued)

*Primary Examiner*—Sanh D. Phu
(74) *Attorney, Agent, or Firm*—Morgan & Finnegan LLP

(57) ABSTRACT

A short-range wireless system and method is disclosed to store and transfer a new type of multimedia data construct called a tag. A user can write text, create a voice clip and append it to the text, take a digital picture and append it to the text, to create a multimedia file as the content of a tag. The creation or modifying of the multimedia file can be done in the user's mobile wireless device or off line and then stored in the mobile device. The multimedia file is then incorporated into the tag or it can be referenced by a pointer in the tag. The multimedia file is artistic expression of the user and the tag uniquely associates the user's identity with the multimedia file by prohibiting alteration of the content after the user completes its creation. A content-originator flag (CFG) value in the tag is set to "false" during the period when the user is creating or modifying the tag's content. When the user completes editing the content of the tag, the content-originator flag (CFG) value is set to true, thereby freezing the content. The tag includes the user's ID, such as his/her international mobile subscriber identity (IMSI) or mobile station ISDN number (MSISDN). Subsequent viewers of the content can make a copy of the content and can then modify it, but they cannot authentically attribute the modified copy to the original user. The system can be implemented as a wireless personal area network (PAN) such as provided in the Bluetooth Standard or a wireless local area network (LAN) such as provided in the IEEE 802.11 Wireless LAN Standard and the HIPERLAN Standard.

74 Claims, 24 Drawing Sheets

U.S. PATENT DOCUMENTS

| | | | |
|---|---|---|---|
| 5,835,061 A | 11/1998 | Stewart | |
| 5,838,685 A | 11/1998 | Hochman | |
| 5,987,099 A | 11/1999 | O'Neill et al. | |
| 6,006,200 A | 12/1999 | Boies et al. | |
| 6,023,241 A | 2/2000 | Clapper | 342/357.13 |
| 6,041,311 A | 3/2000 | Chislenko et al. | |
| 6,044,062 A * | 3/2000 | Brownrigg et al. | 370/238 |
| 6,049,777 A | 4/2000 | Sheena et al. | |
| 6,052,467 A | 4/2000 | Brands | |
| 6,064,980 A | 5/2000 | Jacobi et al. | |
| 6,065,012 A | 5/2000 | Balsara et al. | |
| 6,092,049 A | 7/2000 | Chislenko et al. | |
| 6,108,493 A | 8/2000 | Miller et al. | |
| 6,108,688 A | 8/2000 | Nielsen | |
| 6,119,101 A | 9/2000 | Peckover | |
| 6,134,445 A | 10/2000 | Gould et al. | |
| 6,138,158 A | 10/2000 | Boyle et al. | 709/225 |
| 6,138,159 A | 10/2000 | Phaal | |
| 6,167,278 A | 12/2000 | Nilssen | |
| 6,175,743 B1 | 1/2001 | Alperovich et al. | |
| 6,182,050 B1 | 1/2001 | Ballard | |
| 6,195,651 B1 | 2/2001 | Handel et al. | |
| 6,195,657 B1 | 2/2001 | Rucker et al. | |
| 6,199,099 B1 | 3/2001 | Gershman et al. | |
| 6,205,472 B1 | 3/2001 | Gilmour | |
| 6,236,768 B1 | 5/2001 | Rhodes et al. | |
| 6,243,581 B1 | 6/2001 | Jawanda | |
| 6,253,202 B1 | 6/2001 | Gilmour | |
| 6,253,203 B1 | 6/2001 | O'Flaherty et al. | |
| 6,263,447 B1 | 7/2001 | French et al. | |
| 6,266,048 B1 | 7/2001 | Carau | |
| 6,272,129 B1 | 8/2001 | Dynarski et al. | |
| 6,275,824 B1 | 8/2001 | O'Flaherty et al. | |
| 6,285,879 B1 | 9/2001 | Lechner et al. | |
| 6,317,781 B1 | 11/2001 | De Boor et al. | |
| 6,321,257 B1 | 11/2001 | Kotola et al. | 709/219 |
| 6,330,448 B1 | 12/2001 | Otsuka et al. | |
| 6,351,271 B1 | 2/2002 | Mainwaring et al. | |
| 6,414,955 B1 | 7/2002 | Clare et al. | |
| 6,421,707 B1 | 7/2002 | Miller et al. | |
| 6,430,395 B2 | 8/2002 | Arazi et al. | |
| 6,430,413 B1 | 8/2002 | Wedi et al. | |
| 6,438,585 B2 | 8/2002 | Mousseau et al. | |
| 6,445,921 B1 | 9/2002 | Bell | |
| 6,477,373 B1 | 11/2002 | Rappaport et al. | |
| 6,484,196 B1 | 11/2002 | Maurille | |
| 6,493,550 B1 | 12/2002 | Raith | |
| 6,496,849 B1 | 12/2002 | Hanson et al. | |
| 6,510,381 B2 | 1/2003 | Grounds et al. | |
| 6,515,974 B1 | 2/2003 | Inoue et al. | |
| 6,519,453 B1 | 2/2003 | Hamada et al. | |
| 6,527,641 B1 | 3/2003 | Sinclair et al. | |
| 6,539,225 B1 | 3/2003 | Lee | |
| 6,542,740 B1 | 4/2003 | Olgaard et al. | 455/432 |
| 6,549,768 B1 | 4/2003 | Fraccaroli | |
| 6,554,707 B1 | 4/2003 | Sinclair et al. | |
| 6,560,456 B1 | 5/2003 | Lohtia et al. | |
| 6,580,698 B1 | 6/2003 | Nitta | |
| 6,604,140 B1 | 8/2003 | Beck et al. | |
| 6,625,460 B1 | 9/2003 | Patil | |
| 6,674,403 B2 | 1/2004 | Gray et al. | |
| 6,678,516 B2 | 1/2004 | Nordman et al. | |
| 6,697,018 B2 | 2/2004 | Stewart | |
| 6,721,542 B1 | 4/2004 | Anttila et al. | |
| 6,785,542 B1 | 8/2004 | Blight et al. | |
| 6,909,903 B2 | 6/2005 | Wang | |
| 2001/0007820 A1 | 7/2001 | Do et al. | |
| 2001/0021649 A1 * | 9/2001 | Kinnunen et al. | 455/412 |
| 2001/0034223 A1 | 10/2001 | Rieser et al. | |
| 2001/0039546 A1 | 11/2001 | Moore et al. | |
| 2002/0002705 A1 | 1/2002 | Byrnes et al. | |
| 2002/0006788 A1 | 1/2002 | Knutsson, et al. | |
| 2002/0013815 A1 * | 1/2002 | Obradovich et al. | 709/204 |
| 2002/0015042 A1 | 2/2002 | Robotham et al. | |
| 2002/0019882 A1 | 2/2002 | Soejima et al. | |
| 2002/0022453 A1 | 2/2002 | Balog et al. | |
| 2002/0052873 A1 | 5/2002 | Delgado et al. | |
| 2002/0061741 A1 | 5/2002 | Leung et al. | |
| 2002/0065881 A1 * | 5/2002 | Mansikkaniemi et al. | 709/204 |
| 2002/0082921 A1 | 6/2002 | Rankin | |
| 2002/0083025 A1 | 6/2002 | Robarts et al. | |
| 2002/0094778 A1 | 7/2002 | Cannon et al. | |
| 2002/0126872 A1 | 9/2002 | Brunk et al. | |
| 2002/0158917 A1 | 10/2002 | Sinclair et al. | |
| 2002/0164963 A1 | 11/2002 | Tehrani et al. | |
| 2002/0191017 A1 | 12/2002 | Sinclair et al. | |
| 2002/0193073 A1 | 12/2002 | Fujioka | |
| 2002/0198882 A1 | 12/2002 | Linden et al. | |
| 2003/0002504 A1 | 1/2003 | Forstadius | |
| 2003/0008662 A1 | 1/2003 | Stern et al. | |
| 2003/0013459 A1 | 1/2003 | Rankin et al. | |
| 2003/0027636 A1 | 2/2003 | Covannon et al. | |
| 2003/0036350 A1 | 2/2003 | Jonsson et al. | |
| 2003/0054794 A1 | 3/2003 | Zhang | |
| 2003/0092376 A1 | 5/2003 | Syed | |
| 2003/0115038 A1 | 6/2003 | Want et al. | |
| 2003/0119446 A1 | 6/2003 | Fano et al. | |
| 2003/0119494 A1 | 6/2003 | Alanara et al. | |
| 2003/0140246 A1 | 7/2003 | Kammer et al. | |
| 2003/0171147 A1 | 9/2003 | Sinclair et al. | |
| 2003/0177113 A1 | 9/2003 | Wakita | |
| 2003/0208595 A1 | 11/2003 | Gouge et al. | |
| 2004/0073793 A1 | 4/2004 | Takeda | |
| 2004/0181517 A1 | 9/2004 | Jung et al. | |
| 2004/0181540 A1 | 9/2004 | Jung et al. | |
| 2005/0113066 A1 | 5/2005 | Hamberg | |
| 2005/0260996 A1 | 11/2005 | Groenendaal | |

FOREIGN PATENT DOCUMENTS

| | | |
|---|---|---|
| BE | 1010909 | 3/1999 |
| CN | 1155823 A | 7/1997 |
| CN | 1305286 A | 7/2001 |
| DE | 198 14 162 A1 | 10/1999 |
| EP | 0 788 065 A2 | 8/1997 |
| EP | 0 891 110 A1 | 1/1999 |
| EP | 0 944 176 | 9/1999 |
| EP | 1 041 849 A1 | 10/2000 |
| EP | 1 107 512 A | 6/2001 |
| EP | 1 130 869 A1 | 9/2001 |
| EP | 1 72 991 A1 | 1/2002 |
| EP | 1 187 023 A1 | 3/2002 |
| EP | 1 217 792 A1 | 6/2002 |
| EP | 1 282 289 A2 | 2/2003 |
| JP | 11-11401 | 4/1999 |
| WO | WO 97/10547 A | 3/1997 |
| WO | WO97/49255 | 12/1997 |
| WO | WO 99/20060 A | 4/1999 |
| WO | WO99/32985 | 7/1999 |
| WO | WO99/37105 | 7/1999 |
| WO | WO99/51048 | 10/1999 |
| WO | WO 99/66428 | 12/1999 |
| WO | WO 00/11563 | 3/2000 |
| WO | WO 00/11793 | 3/2000 |
| WO | WO 00/32002 | 6/2000 |
| WO | WO 00/67435 A | 11/2000 |
| WO | WO 00/69202 | 11/2000 |
| WO | WO 00/74424 A1 | 12/2000 |
| WO | WO 01/33797 A | 5/2001 |
| WO | WO 01/35253 | 5/2001 |
| WO | WO 01/35269 | 5/2001 |
| WO | WO 01/39577 A1 | 6/2001 |
| WO | WO 01/46826 | 6/2001 |
| WO | WO 01/50299 | 7/2001 |

| | | |
|---|---|---|
| WO | WO 01/67799 | 9/2001 |
| WO | WO 01/69864 A2 | 9/2001 |
| WO | WO 01/82532 | 11/2001 |
| WO | WO 01/86419 A2 | 11/2001 |
| WO | WO 01/97433 A2 | 12/2001 |
| WO | WO 02/03626 | 1/2002 |
| WO | WO 02/11456 | 2/2002 |
| WO | WO 03/017592 | 2/2003 |
| WO | WO 03/088578 A1 | 10/2003 |
| WO | WO 2004/004372 | 1/2004 |

OTHER PUBLICATIONS

Bluetooth Specification Version 1.0 B; Service Discovery Protocol, Dec. 1, 1999, pp. 324-384.
http://www.ebay.com, Aug. 13, 2003, 2 pp.
http://www.amazon.com.exec/obidos/subst/home/home.html/02202250..., Aug. 13, 2003, 4 pp.
http://www.genesconnected.co.uk, Aug. 13, 2003, 1 pp.
http://www.commerce.usask.ca/faculity/linksE_commerce/lovegety.htm, Aug. 13, 2003, 2 pp.
http://www.saycupid.com, Aug. 13, 2003, 2 pp.
Foner, L. (1996), "A Multi-Agent Referral System for MatchMaking", In Proceedings the First International Conference on the Practical Application of Intelligent Agents and Multi-Agent Technology (PAAM 96), London, Apr. 22-24, 1996, 245-261.
Bluetooth Specification, "Bluetooth Assigned Numbers, Appendix VIII", Version 1.0B, Nov. 29, 1999, pp. 1010-1032.

U.S. Appl. No. 09/406,596, filed Sep. 24, 1999, Paul D. Schulz.
U.S. Appl. No. 10/836,241, filed May 3, 2004, Heinonen, et al.
U.S. Appl. No. 10/954,197, filed Oct. 1, 2004, Malinen, et al.
U.S. Appl. No. 10/977,258, filed Nov. 1, 2004, Aholainen, et al.
International Search Report mailed on Aug. 7, 2003, in International Application No. PCT/US03/02683.
Peddemors et al. "Combining Presence, Location and Instant Messaging In A Context-Aware Mobile Application Framework", GigaMobile/D2.8, Telematica Instituut, Mar. 20, 2002, pp. 3-13.
Bisdikian et al. "Quests In A Tetherless World", Wireless Communications and Mobile Computing 2002; 2:449-464, John Wiley & Sons, Ltd., 2002, pp. 449-464.
"How to Inquire About Services On a Remote Device", web page [online], Symbian Ltd, 2002 [1 page retrieved on Dec. 31, 2003]. Retrieved from the Internet: <http://www.symbian.com/developer/techlib/v70docs/SDL v7.0/doc source/DevGuides/cpp/..>.
Supplementary European Search Report dated Feb. 23, 2007.
Supplementary European Search Report dated Feb. 12, 2007.
Supplementary European Search Report dated Mar. 01, 2007.
Chinese Office Action dated Feb. 16, 2007.
09/854,635 May 15, 2001, Kaita et al.
09/950,773 Sep. 13, 2001, Kaita et al.
09/985,044 Nov. 01, 2001, Heinonen et al.
09/985,192 Nov. 01, 2001, Heinonen et al.
09/985,193 Nov. 01, 2001, Heinonen et al.
10/101,688 Mar. 21, 2002, Heinonen et al.

* cited by examiner

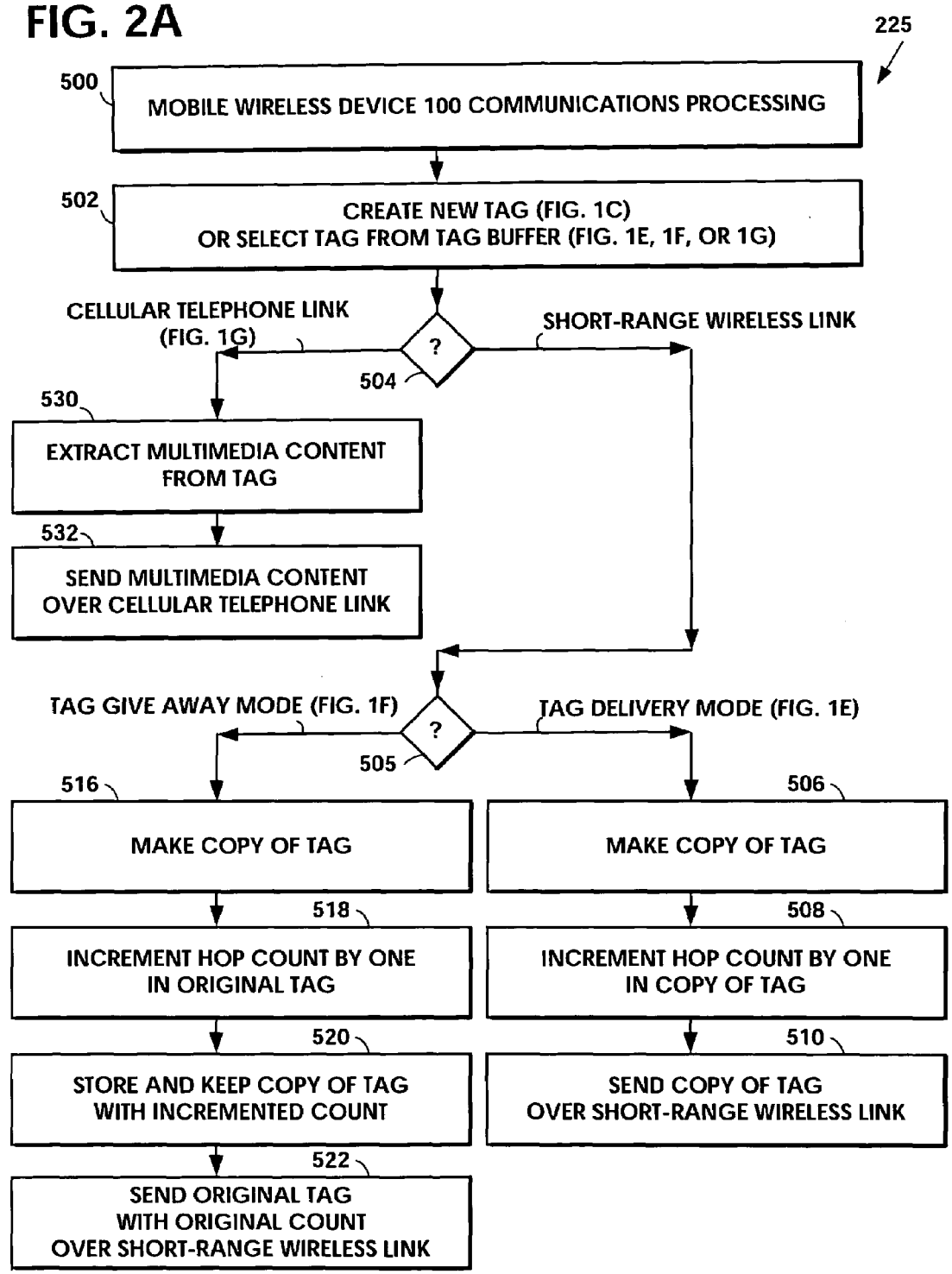

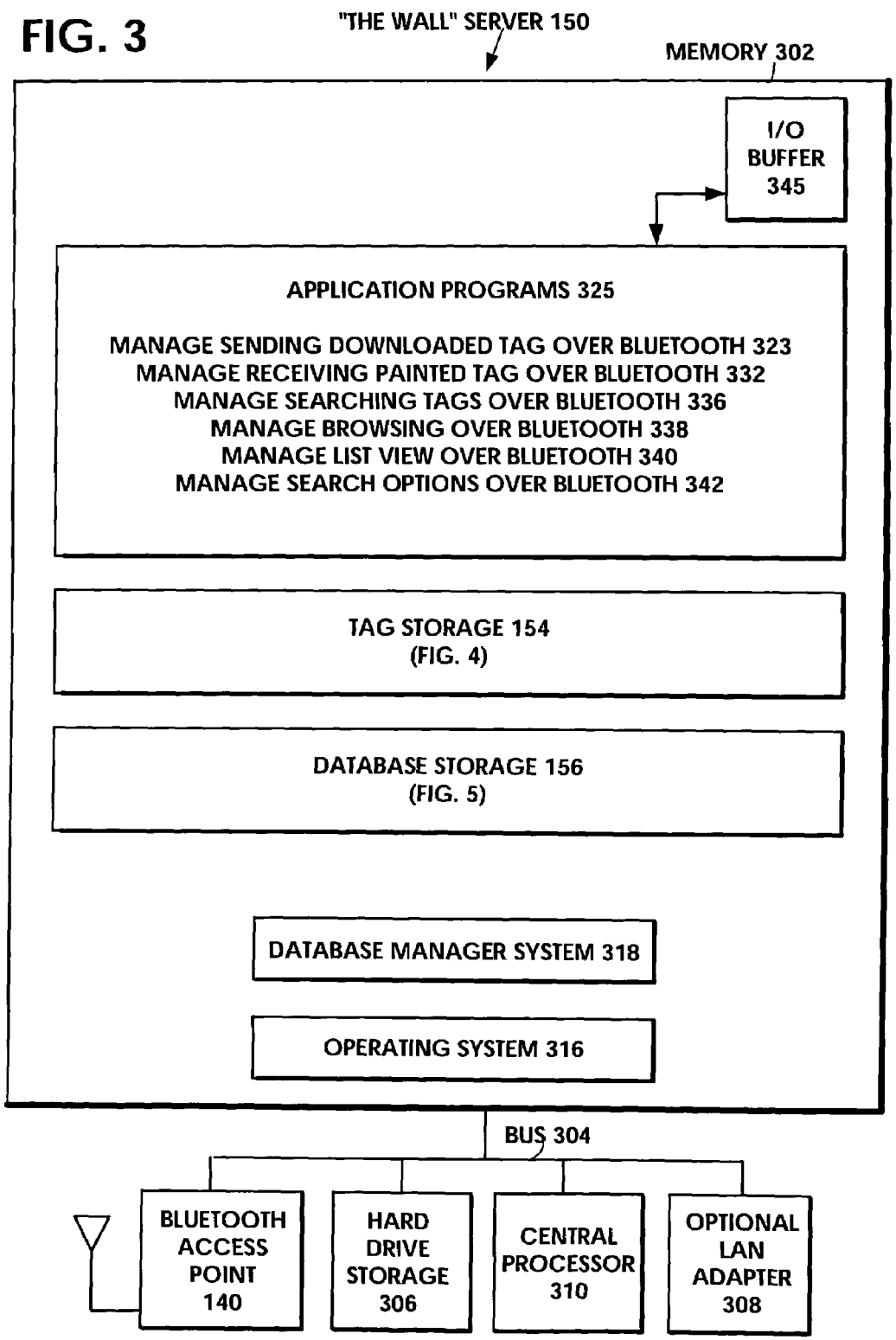

FIG. 5

"THE WALL" DATABASE STORAGE 156

DATABASE 158

MAC & DIGITAL SIGNATURE

| TAG INDEX | AUTHOR NAME | PERSONAL ID IMSI/MSISDN | HOP COUNT | CFG FLAG | PFG FLAG | MAC SIG. | TIME STAMP | "THE WALL" COORDINATES X,Y | COMMENT CHAIN LINK |
|---|---|---|---|---|---|---|---|---|---|
| TAG 138 | USER 100 | +368102375 | HOP=1 | CFG =TRUE | PFG= FALSE | MAC SIG. | 26:01:02 | X138,Y138 | |
| TAG 134 | MONIQUE | +358402370 | HOP=1 | CFG =TRUE | PFG= FALSE | MAC SIG. | 18:12:01 | X134,Y134 | BAK_LINK TO TAG 132 |
| TAG 132 | MAX | +358432373 | HOP=1 | CFG =TRUE | PFG= FALSE | MAC SIG. | 04:12:01 | X132,Y132 | FOR_LINK TO TAG 134 |
| TAG 130 | TINA | +358332372 | HOP=1 | CFG =TRUE | PFG= FALSE | MAC SIG. | 03:12:01 | X130,Y130 | |
| TAG 128 | EIFFEL TOWER | --- | HOP=1 | | PFG= FALSE | MAC SIG. | 01:12:01 | X128,Y128 | |
| | | | | | | | | | |

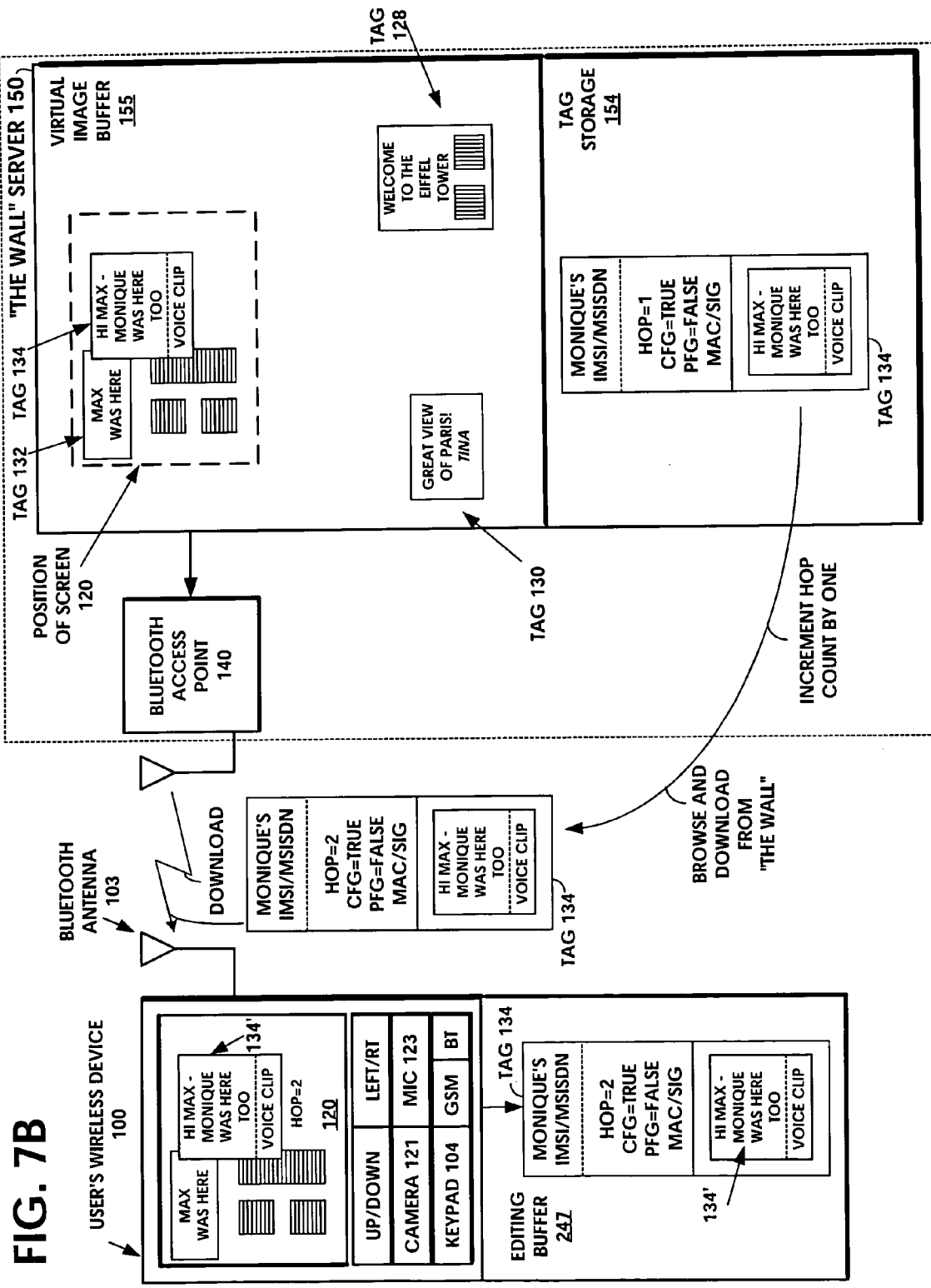

SHORT-RANGE WIRELESS SYSTEM AND METHOD FOR MULTIMEDIA TAGS

FIELD OF THE INVENTION

The invention disclosed broadly relates to ubiquitous computing and more particularly relates to improvements in short-range wireless technology.

BACKGROUND OF THE INVENTION

Short-Range Wireless Systems

Short-range wireless systems have a typical range of one hundred meters or less. They often combine with systems wired to the Internet to provide communication over long distances. The category of short-range wireless systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best-known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks (LANs) generally operate at higher peak speeds of between 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HIPER-LAN Standard, which operates in the 5 GHz U-NII band.

The Bluetooth Short-Range Wireless Technology

Bluetooth is a short-range radio network, originally intended as a cable replacement. It can be used to create networks of up to eight devices operating together. The Bluetooth Special Interest Group, *Specification of the Bluetooth System*, Volumes 1 and 2, Core and Profiles: Version 1.1, Feb. 22, 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten-meter radio communications range and to discover what services they offer, using a service discovery protocol (SDP).

The SDP searching function relies on links being established between the requesting Bluetooth device, such as a stationary access point device, and the responding Bluetooth device, such as a mobile user's device. When the mobile user's device enters within communicating range of the access point, its Link Controller layer in its transport protocol group handles the exchange of inquiry and paging packets to establish the initial link with the access point device. Then the Logical Link Control and Adaptation Protocol (L2CAP) layer in the transport protocol group passes the link status up to the layers in the middleware protocol group. The SDP searching function in the middleware protocol group can then be used to find out about application programs in the responding Bluetooth device that may provide desired services.

Bluetooth usage models are formally specified in application profiles set forth in the *Specification of the Bluetooth System*, referred to above. There are 13 application profiles described in Version 1.1 of the specification, including the Generic Access Profile (GAP), Service Discovery Profile (SDP), Generic Object Exchange Profile (GOEP), and Object Push Profile. The Generic Access Profile (GAP) defines how two Bluetooth units discover and establish a connection with each other. The service discovery protocol (SDP) defines the investigation of services available to a Bluetooth unit from other units. Generic Object Exchange Profile (GOEP) describes defines the set of protocols and procedures used by applications in handling object exchanges, e.g. File Transfer Synchronization using the Object Exchange (OBEX) Standard. The OBEX Standard is specified by the Infrared Data Association (IrDA), Object Exchange Protocol, Version 1.2. The OBEX Standard was adopted by Bluetooth as a session-oriented protocol, which allows multiple request/response exchanges in one session as a binary HTTP protocol. The Bluetooth Object Push Profile specification discusses the application of exchanging virtual business cards using the OBEX Standard.

The IEEE 802.11 Wireless LAN Standard

The IEEE 802.11 Wireless LAN Standard defines at least two different physical (PHY) specifications and one common medium access control (MAC) specification. The IEEE 802.11(a) Standard is designed for either the 2.4 GHz ISM band or the 5 GHz U-NII band, and uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 networks can be configured where the mobile stations communicate with a fixed access point. IEEE 802.11 also supports distributed activities similar those of the Bluetooth piconets. The IEEE 802.11 standard provides wireless devices with service inquiry features similar to the Bluetooth inquiry and scanning features.

In order for an IEEE 802.11 mobile station to communicate with other stations in a network, it must first find the stations. The process of finding another station is by inquiring. Active inquiry requires the inquiring station to transmit queries and invoke responses from other wireless stations in a network. In an active inquiry, the mobile station will transmit a probe request frame. If there is a network on the same channel that matches the service set identity (SSID) in the probe request frame, a station in that network will respond by sending a probe response frame to the inquiring station. The probe response includes the information necessary for the inquiring station to access a description of the network. The inquiring station will also process any other received probe response and Beacon frames. Once the inquiring station has processed any responses, or has decided there will be no responses, it may change to another channel and repeat the process. At the conclusion of the inquiry, the station has accumulated information about the networks in its vicinity. Once a station has performed an inquiry that results in one or more network descriptions, the station may choose to join one of the networks. The IEEE 802.11 Wireless LAN Standard is published in three parts as *IEEE* 802.11-1999; *IEEE* 802.11a-1999; and *IEEE* 802.11b-1999, which are available from the IEEE, Inc. web site http://grouper.ieee.org/groups/802/11.

High Performance Radio Local Area Network (HIPERLAN)

The HIPERLAN standard provides a wireless LAN with a high data rate of up to 54 Mbps and a medium-range of 50 meters. HIPERLAN wireless LANs provide multimedia distribution with video QoS, reserved spectrum, and good in-building propagation. There are two HIPERLAN standards. HIPERLAN Type 1 is a dynamic, priority driven channel access protocol similar to wireless Ethernet. HIPERLAN Type 2 is reserved channel access protocol similar to a wireless version of ATM. Both HIPERLAN Type 1 and HIPERLAN Type 2 use dedicated spectrum at 5 GHz. HIPERLAN Type 1 uses an advanced channel equalizer to deal with intersymbol interference and signal multipath. HIPERLAN Type 2 avoids these interference problems by using OFDM and a frequency transform function. The HIPERLAN Type 2 specification offers options for bit rates of 6, 16, 36, and 54 Mbps. The physical layer adopts an OFDM multiple carrier scheme using 48 carrier frequencies per OFDM symbol. Each carrier may then be modulated using BPSK, QPSK, 16-QAM, or 64-QAM to provide different data rates. The modulation schemes chosen for the higher bit rates achieve throughput in the range 30–50 Mbps.

The HIPERLAN Type 1 is a dynamic, priority driven channel access protocol that can form networks of wireless devices. HIPERLAN Type 1 networks support distributed activities similar those of the Bluetooth piconets and IEEE 802.11 independent basic service sets (IBSS). The HIPERLAN Type 1 standard provides wireless devices with service inquiry features similar to those of the Bluetooth inquiry and scanning features and the IEEE 802.11 probe request and response features. An overview of the HIPERLAN Type 1 principles of operation is provided in the publication *HIPERLAN Type 1 Standard*, ETSI ETS 300 652, WA2 December 1997.

HIPERLAN Type 2 is a reserved channel access protocol that forms networks. HIPERLAN Type 2 networks support distributed activities similar those of the HIPERLAN Type 1 networks, Bluetooth piconets and IEEE 802.11 independent basic service sets (IBSS). HIPERLAN Type 2 provides high-speed radio communication with typical data rates from 6 MHz to 54 Mbps. It connects portable devices with broadband networks that are based on IP, ATM and other technologies. Centralized mode is used to operate HIPERLAN Type 2 as an access network via a fixed access point. A central controller (CC) in the fixed access point provides QoS coordinates the access of the mobile stations support. User mobility is supported within the local service area and wide area roaming mobility can also be supported. An overview of the HIPERLAN Type 2 principles of operation is provided in the Broadband Radio Access Networks (BRAN), *HIPERLAN Type 2; System Overview*, ETSI TR 101 683 VI.I.1 (2000-02) and a more detailed specification of its ad hoc network architecture is described in *HIPERLAN Type 2, Data Link Control (DLC) Layer; Part 4, Extension for Home Environment*, ETSI TS 101 761-4V1.2.1 (2000-12).

SUMMARY OF THE INVENTION

A short-range wireless system and method is disclosed to store and transfer a new type of multimedia data construct called a tag. A user can write text, create a voice clip and append it to the text, take a digital picture and append it to the text, to create a multimedia file as the content of a tag. The creation or modifying of the multimedia file can be done in the user's mobile wireless device or off line and then stored in the mobile device. The multimedia file is then incorporated into the tag or it can be referenced by a pointer in the tag. The multimedia file is artistic expression of the user and the tag uniquely associates the user's identity with the multimedia file by prohibiting alteration of the content after the user completes its creation. A content-originator flag (CFG) value in the tag is set to "false" during the period when the user is creating or modifying the tag's content. When the user completes editing the content of the tag, the content-originator flag (CFG) value is set to true, thereby freezing the content. The tag includes the user's ID, such as his/her international mobile subscriber identity (IMSI) or mobile station ISDN number (MSISDN). Subsequent viewers of the content can make a copy of the content and can then modify it, but they cannot authentically attribute the modified copy to the original user. The invention can be implemented as a wireless personal area network (PAN) such as provided in Bluetooth Standard or a wireless local area network (LAN) such as provided in the IEEE 802.11 Wireless LAN Standard and the HIPERLAN Standard.

In one aspect of the invention, a server is connected to a short-range wireless access point, such as a Bluetooth access point. The access point is typically located at a frequent gathering place, such as a famous landmark, a shopping center, a school, or a home. Users carry Mobile Bluetooth devices, which are programmed in accordance with the invention to enable the users to create tags that contain multimedia messages. The messages are typically aphorisms, notes, jokes, and the like, which the users have previously prepared or spontaneously create. The tags are then uploaded over the Bluetooth link to the server for posting on a virtual "wall" for viewing by other users with Bluetooth viewing devices. The user has effectively "painted the wall" with his/her uploaded tag.

A user can browse tags that have previously been "painted on the wall", by viewing a list downloaded from the server, listing the tags stored in the server. The user can also perform a database search for tags using a query specifying particular IMSI or MSISDN values or user names. A list is then downloaded from the server, listing the tags stored in the server having the particular IMSI or MSISDN values or user names. The user may have old tags stored in his/her mobile device, and the IMSI or MSISDN values or user names can be extracted from those tags and used as the query sent to the server. A database in the server stores information about each tag in the server, in a tag record. Each tag record includes the information contained in the corresponding tag, to enable searches to be made on the author's name, IMSI or MSISDN identity, time that the tag was recorded, and the like. An additional field is included that links the tags forward or backward, if they are part of a sequence of user comments that have been recorded on "the wall". "The wall" server can be connected to a remote, backup server that stores a copy of all of the tags and the database, to be used in the event of disaster recovery. Additionally, the backup server can provide an accessible, bulk storage for old tags, to reduce the storage requirements on "the wall" server.

In addition, when the original user has created the content in his/her mobile wireless device, a hop count value of zero is written into the tag. If the user uploads the tag to the server and writes the tag on "the wall", the hop count is incremented by one. Whenever a later user downloads a copy of the tag from the server, the hop count is incremented again by one. When one user sends a copy of the tag to another user, each transmission increments the hop count in the tag by one. This feature makes original copies of the content more valuable, as signified by a low hop count value in the tag. A person-to-person flag (PFG) is also included in the tag. The initial value of the person-to-person flag (PFG) is set to a value of "true" when the originating user creates the tag. The person-to-person flag (PFG) value of "true" verifies that the tag has only been transferred from person-to-person, and has not been downloaded from "the wall" server. When the tag is uploaded to "the wall" server, the value of the person-to-person flag (PFG) is reset to a value of "false", and can never be returned to a value of "true". Thus, a tag directly received from a famous person will have a person-to-person hop count of one, and thus be an item of value, similar to an original, famous autograph. As long as the tag is not transferred to "the wall" server, the person-to-person flag (PFG) value remains "true" and the tag has a greater value than it would if it had been obtained by downloading it from "the wall" server.

One technique for freezing the content of the tag so that later viewers cannot attribute the modified content to the original user, is provided by public key encryption protocols, such as the secure sockets layer protocol. The originating party's device can compute a message authentication code (MAC) hash value on the content of the tag and then digitally sign the MAC using the originating party's secret key. Each receiving party's device decrypts the signed MAC using the originating party's public key and compares the recovered MAC with a reference MAC computed on the received content of the tag. If the two MAC values are equal, then the receiving party knows that the content has not been modified since it left the device of the originating party.

If the user has a Bluetooth equipped cellular telephone, he/she can transmit the multimedia content of a tag over a cellular telephone network to a cellular telephones capable of receiving multimedia files. However, tags cannot be transmitted in any other manner than over a short-range wireless link, such as a Bluetooth link. The user of a Bluetooth mobile device must be close enough to another Bluetooth device to directly communicate over the Bluetooth link in order to send a tag. The user must be at the location of the access point for the "wall" server in order to "paint the wall" with his/her tag. The user must be at the location of his/her friend in order to deliver his/her tag to the friend. This requirement of proximity between sender and receiver of a tag is imposed by the programmed operation of the Bluetooth devices, in accordance with the invention. There are two modes that the user can select from to transfer his/her tag to a friend. The first mode is a "tag delivery", whereby the sending user transfers a copy of the tag in the sender's device, causing the hop count to be incremented by one in the copy of the tag received by the recipient. The second mode is called "tag give-away", whereby the sending user transfers the tag currently in the sender's device, causing the hop count to remain unchanged in the tag received by the recipient. The sender effectively keeps a copy of the tag, and the copy in the sender's device is incremented by one.

In an alternate embodiment of the invention, the server is programmed to store the tags in association with two dimensional X,Y coordinates, in a tag storage in the server. A user can browse tags that have been posted on "the wall", by using up/down and left/right controls displayed in the GUI of the user's Bluetooth device.

In another alternate embodiment of the invention, payment may be required before a user is allowed to upload a tag to "paint the wall". If the user has a Bluetooth equipped cellular telephone, he/she is required to send a short message service (SMS) charge-authorizing message over the cellular telephone system to an account-charging server, authorizing his/her account to be charged. The account-charging server returns an SMS payment token to the user's device over the cellular telephone system. The payment token must be received by the user's device before the user is allowed to upload a tag to "paint the wall".

In another alternate embodiment of the invention, payment may be required before a user is allowed to download a tag from the "the wall" server. A digital rights management (DRM) authorization message is sent by the user's device over the Bluetooth link to "the wall" server. A DRM module in the server is connected over a network such as the Internet, to a DRM account-charging server. The DRM account charging server handles the necessary steps in debiting the user's account, and then returns an enabling signal to "the wall" server. "The wall" server then downloads over the Bluetooth link, the tag requested by the user.

In another alternate embodiment of the invention, payment may be required before a user is allowed to download a tag from the "the wall" server. A payment accumulator is included in the user's device, which accumulates authorized charges for downloading a plurality of tags from one or many "wall" servers over an extended period, such as a month. If the user has a Bluetooth equipped cellular telephone, then at the end of the month, an SMS message containing the monthly total authorized charges is sent by the user's device over the cellular telephone system to an account charging server, authorizing his/her account to be charged.

In another alternate embodiment of the invention, payment may be required from a requesting user, before a providing user will transfer a tag to the requesting user. A digital rights management (DRM) module in each mobile wireless device handles the exchange of charge authorization messages over the Bluetooth link between the mobile devices. The DRM module in the requestor's device sends a charge-authorizing message to the provider's device. The provider's device then sends the tag requested by the requester, over the Bluetooth link.

In another alternate embodiment of the invention, a tag can be automatically transferred from one Bluetooth device to another, whether stationary or mobile. The user's mobile Bluetooth device can be programmed to listen or scan for any Bluetooth access point device connected to a "wall" server. The SDP message exchange will tell the mobile device of the availability of "the wall" services. When the user's mobile device recognizes "a wall" within communications range, the user's mobile device uploads the user's tag and automatically "paints the wall". The user's mobile device can be programmed to automatically send a tag to any other Bluetooth device, including mobile devices. A "tag worm" can be created, wherein the tag automatically propagates from user device to user device, as users walk about. A user can prevent receiving unsolicited tags by turning off this feature.

In another alternate embodiment of the invention, a tag can be transferred from the user's mobile device to a "wall" server in the user's home, as a "personal or family tag storage". The personal home "wall" server is programmed to check the IMSI or MSISDN identity of the mobile device storing the tags, according to an embodiment of the present invention. The user can store and retrieve his/her tags from the personal home "wall" server without changing the hop counts in the tags. If an unauthorized person or device were to attempt retrieving the user's tags, the personal home "wall" server can prevent downloading the tags, or it can increment the hop counts in copies of the tags that are downloaded.

In another alternate embodiment of the invention, "the wall" server includes a queuing management system. In this embodiment, the short-range wireless access point for "the Wall" server is located within the premises of a business. "The wall" server performs the function of establishing a queue of customers waiting for service, such as in a bank or at a funfair or the like. The customer sends his/her Tag (including his/her presence/ID-information) to "the Wall" server. "The wall" server registers the customer as being on a virtual queuing line. When the customer uploads his/her tag to the server, the server can optionally return another tag that is an advertisement message of the business. After registering, the customer can optionally browse other tags from "the Wall" server while awaiting his/her turn within the premises of the business. Alternately, the customer can leave the premises of the business and when his/her turn is reached on the virtual queue, "the Wall" server sends a notification message informing the customer that it is his/her turn at the front of the queue. The notification message can be delivered over a cellular telephone network as an SMS message. Alternately, the notification message can be transmitted over a LAN connected to "the wall" server, and delivered over a Bluetooth link to the customer's device by a Bluetooth access point connected to the LAN.

DESCRIPTION OF THE FIGURES

FIG. 2A is a flow diagram of the mobile wireless device communications processing method 500 in the applications programs 225 of the mobile wireless device 100.

FIG. 3 illustrates the memory and components of the "the wall" server 150, according to an embodiment of the present invention.

FIG. 5 illustrates the database storage 156 in the "the wall" server 150, according to an embodiment of the present invention.

FIG. 7B illustrates the Bluetooth equipped cellular telephone 100 downloading tag 134 over the Bluetooth link from "the wall" server, in the alternate embodiment of the invention, according to an embodiment of the present invention.

DISCUSSION OF THE PREFERRED EMBODIMENT

Figure 1:
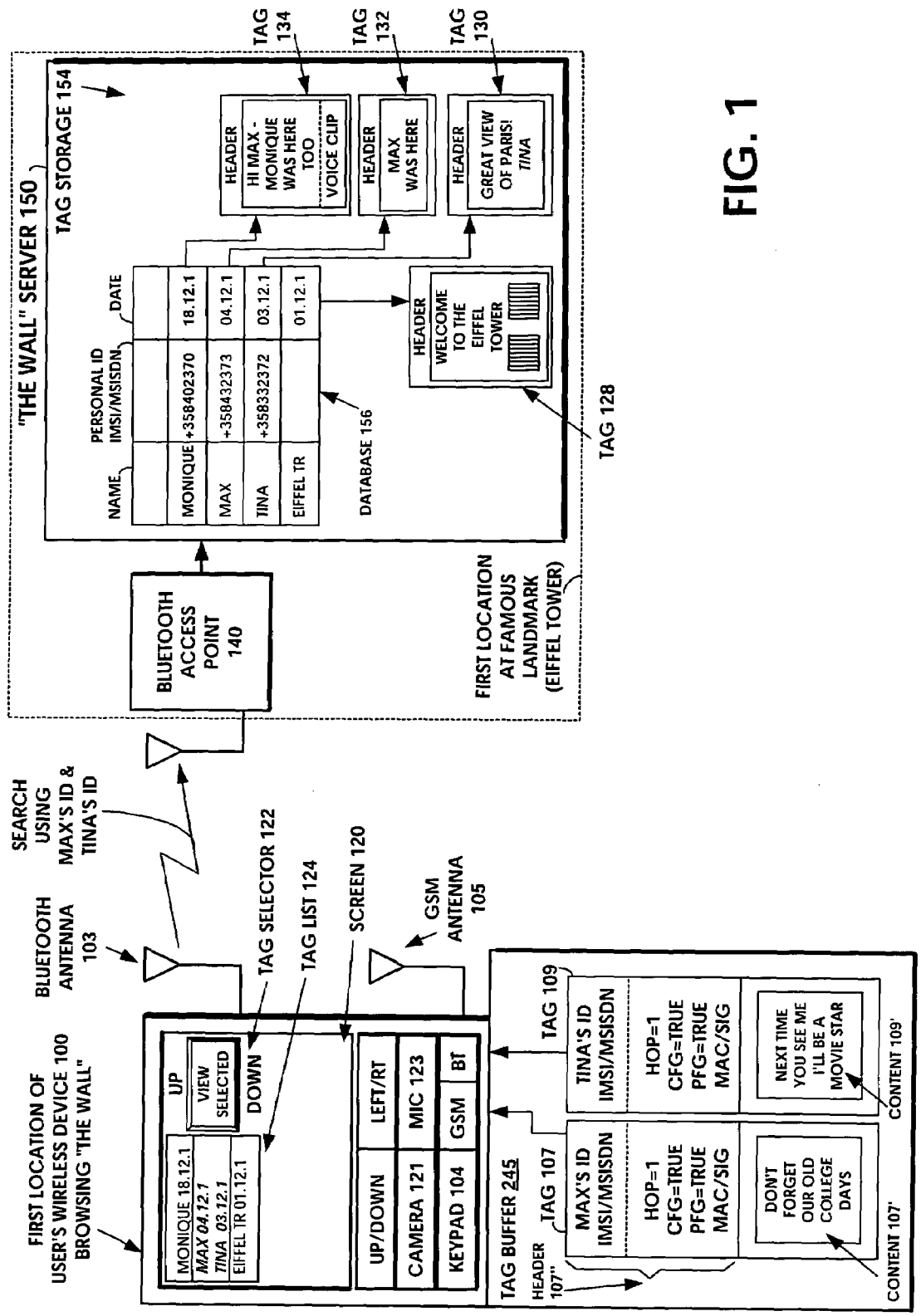
FIG. 1 illustrates a Bluetooth equipped cellular telephone 100 searching over the Bluetooth link for tags in "the wall" server 150, using the tag author's name, IMSI or MSISDN identity, according to an embodiment of the present invention. A list of tags is viewed and the multimedia content of selected tags is viewed in the device's browser.

In the following description of the preferred embodiment, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

It is human nature to leave one's mark when visiting a place. Leaving one's mark can range from signing a guest book to spray-painting a wall. If a person had the possibility to leave an electronic tag commemorating the fact of their visit, such as to the Eiffel Tower, it is natural that they would do it. Leaving an electronic tag would be even more likely if it could be done inexpensively and easily with one's mobile phone. It would be an attractive feature to be able to commemorate one's visit to a famous place by leaving an electronic tag that would be retained at that place and be visible years later upon one's return. A person could write messages to be left for their friends to find, in the classic manner of leaving one's mark.

One aspect of the invention is a system and method to create an electronic tag, which is a personal multimedia message that can only be delivered within a personal area, such as within the range of a personal area network (PAN). The feature of personal area delivery emphasizes that the sender must physically be at a place, or be nearby a person receiving the electronic tag. An electronic tag can only be delivered from one person to another within the personal area. The preferred implementation of the invention is by communication with Bluetooth devices. The sender and the receiver must have their Bluetooth devices physically nearby each other in order to transfer the electronic tag. The invention can be implemented as a wireless personal area network (PAN) such as provided in Bluetooth Standard, Radio Frequency Identification (RFID), and Infrared Data Protocol networks (IrDA) or a wireless local area network (LAN) such as provided in the IEEE 802.11 Wireless LAN Standard and the HIPERLAN Standard.

Another aspect of the invention is "the wall" server, a storage device connected to a Bluetooth access point located at a place where people gather. An electronic tag containing a multimedia message can be published at a place, such as the Eiffel Tower, by the sender transmitting it over the Bluetooth link to "the wall" server. To publish in this manner, the sender must physically be there. Electronic tags that are published by uploading them in this manner to "the wall" server, can be browsed and downloaded by others using their Bluetooth devices.

In another aspect of the invention, a person having a Bluetooth equipped cellular telephone can publish his/her own content on places where people gather, and thus create circulating content. The multimedia messages contained in an electronic tag can be extracted and relayed over the cellular telephone network as a multimedia message. The best aphorisms, jokes, etc. from "the wall" server can be circulated. It is not the electronic tag, itself, that is transmitted over the cellular network, but the multimedia content of the tag. The electronic tag, itself, can only be transferred over a short-range wireless radio link, such as a Bluetooth link, to preserve the close proximity of the sender and the receiver.

The multimedia content of an electronic tag is the artistic expression of its creator. In another aspect of the invention, the electronic tag uniquely associates the creator's identity with the multimedia content by prohibiting alteration of the content after the user completes its creation. The electronic tag includes the creator's ID, such as his/her international mobile subscriber identity (IMSI) or mobile station ISDN number (MSISDN). Subsequent viewers of the content can make a copy of the content and can then modify it, but they cannot authentically attribute the modified copy to the original user.

In another aspect of the invention, a hop count is contained in the electronic tag. Collectors will attribute greater value to those tags with a low hop count. For example, instead of collecting autographs, one collects electronic tags of famous people that he/she meets. A collector, upon meeting Tina Turner, receives her electronic tag with a hop count of one. The collector will attribute a high value to that tag. The low hop count indicates that the collector actually met Tina Turner. The collector can show the tag to friends. The hop count information indicates that the tag is an original "first generation tag". If the collector were to give away the tag to a friend, the collector looses the original tag, but retains a copy with an increased hop count. Alternately, if the collector delivers a copy of the tag to a friend, the friend receives the copy with an increased hop count, while the collector retains the original. These transfers of the tag can only occur over a short-range wireless radio link, such as a Bluetooth link, to preserve the close proximity of the sender and the receiver.

FIG. 1 illustrates a Bluetooth equipped cellular telephone 100 searching for tags in "the wall" server 150, using the tag author's name, IMSI or MSISDN identity, according to an embodiment of the present invention. The Bluetooth devices are in close proximity to one another and use the Bluetooth link to exchange tags. The mobile wireless device 100 of FIG. 1 is equipped with circuits 103 for short-range wireless systems and circuits 105 for cellular telephone communications systems. Cellular telephone communications systems include GSM, GPRS, UMTS, EDGE, and the like. An example of such a mobile wireless device 100 is a Bluetooth-equipped GSM cellular telephone.

During an initial period when the mobile wireless device 100 is within the coverage area of the short range wireless access point 140, it exchanges inquiry and paging packets and service discovery protocol (SDP) packets with the access point 140. In this example, the short-range wireless access point 140 is a Bluetooth access point and the short-range wireless circuits in the mobile wireless device 100 are Bluetooth circuits. The user has previously actuated the Bluetooth mode button "BT" on the keypad 104 and the Bluetooth circuits have completed their exchange of inquiry, paging, and service discovery packets with the Bluetooth access point 140.

In this example, the user wishes to search the tags on "the wall" server 150, using the tag author's name, IMSI or MSISDN identity, as taken from the old tags 107 and 109 stored in the tag buffer 245. Tag 107 includes the header 107" containing Max's ID, which is an IMSI or MSISDN identity, a hop count value of one, a content-originator flag (CFG) value of "true", a person-to-person flag (PFG) value of "true", a message authentication code (MAC) and Max's digital signature (SIG). Tag 107 also includes multimedia content 107'. The user wishes to search the tags on "the wall" server 150, using Max's IMSI identity. Tag 109 includes a header containing Tina's ID, which is an IMSI or MSISDN identity, a hop count value of one, a content-originator flag (CFG) value of "true", a person-to-person flag (PFG) value of "true", a message authentication code (MAC) and Tina's digital signature (SIG). Tag 109 also includes multimedia content 109'. The user wishes to search the tags on "the wall" server 150, using Tina's IMSI identity. The user's device 100 extracts the IMSI identities from tags 107 and 109 and assembles a query that it sends over the Bluetooth link to the server 150. In this example the query terms represent Max's IMSI identity and Tina's IMSI identity.

Figure 4:
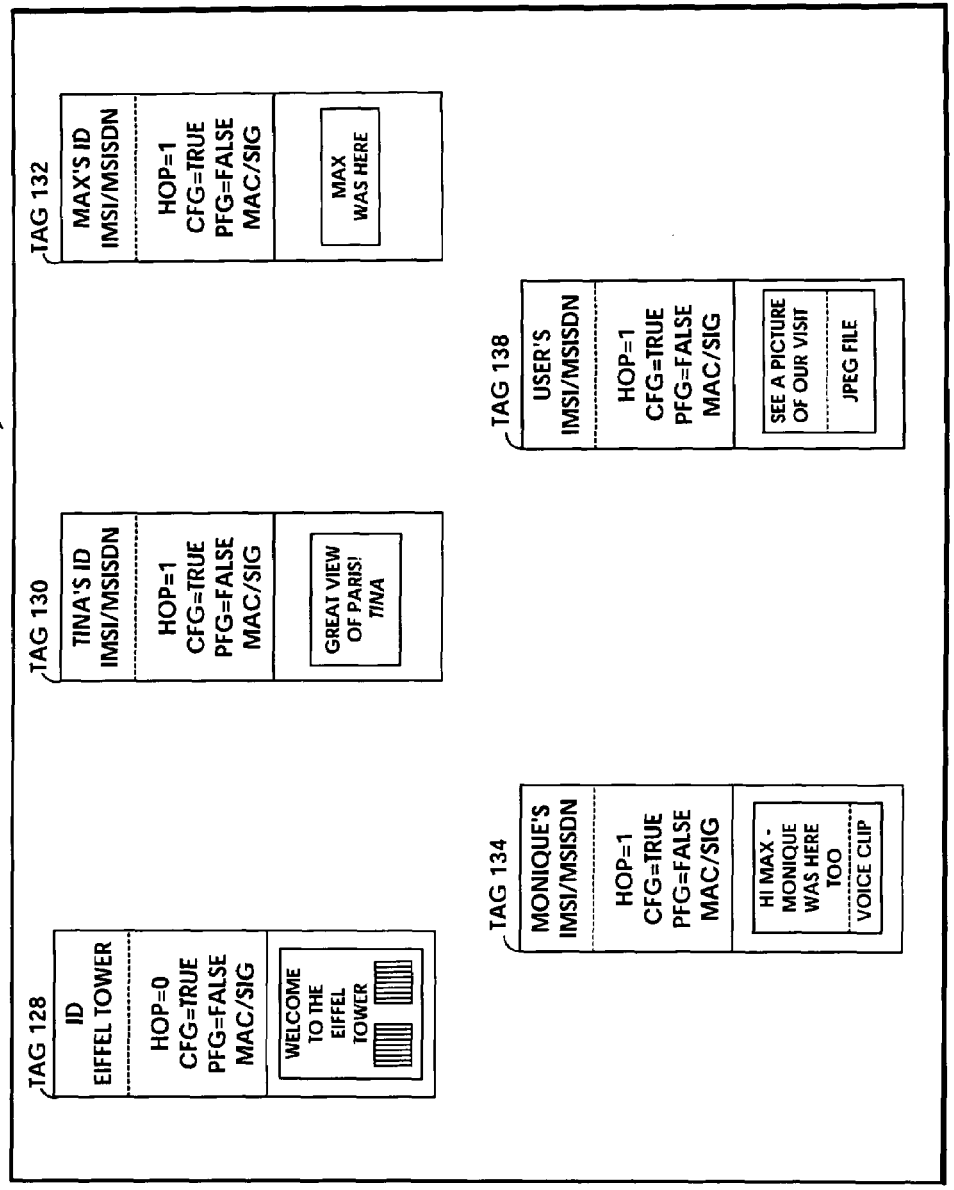
FIG. 4 illustrates the tag storage 154 in the "the wall" server 150, according to an embodiment of the present invention.

The "wall server" 150 includes the tag storage 154 and the database storage 156. Tags 128, 130, 132, and 134 are currently in the tag storage 154, which is shown in FIG. 4. A user can browse tags 128, 130, 132, and 134 that have previously been "painted on the wall", using the tag selector 122 on the device 100 to view a list 124 downloaded from the server 150, listing the tags stored in the server. Since each of the tags 130, 132, and 134 has been uploaded to the server 150, each has a person-to-person flag (PFG) value of "false".

Figure 1A:
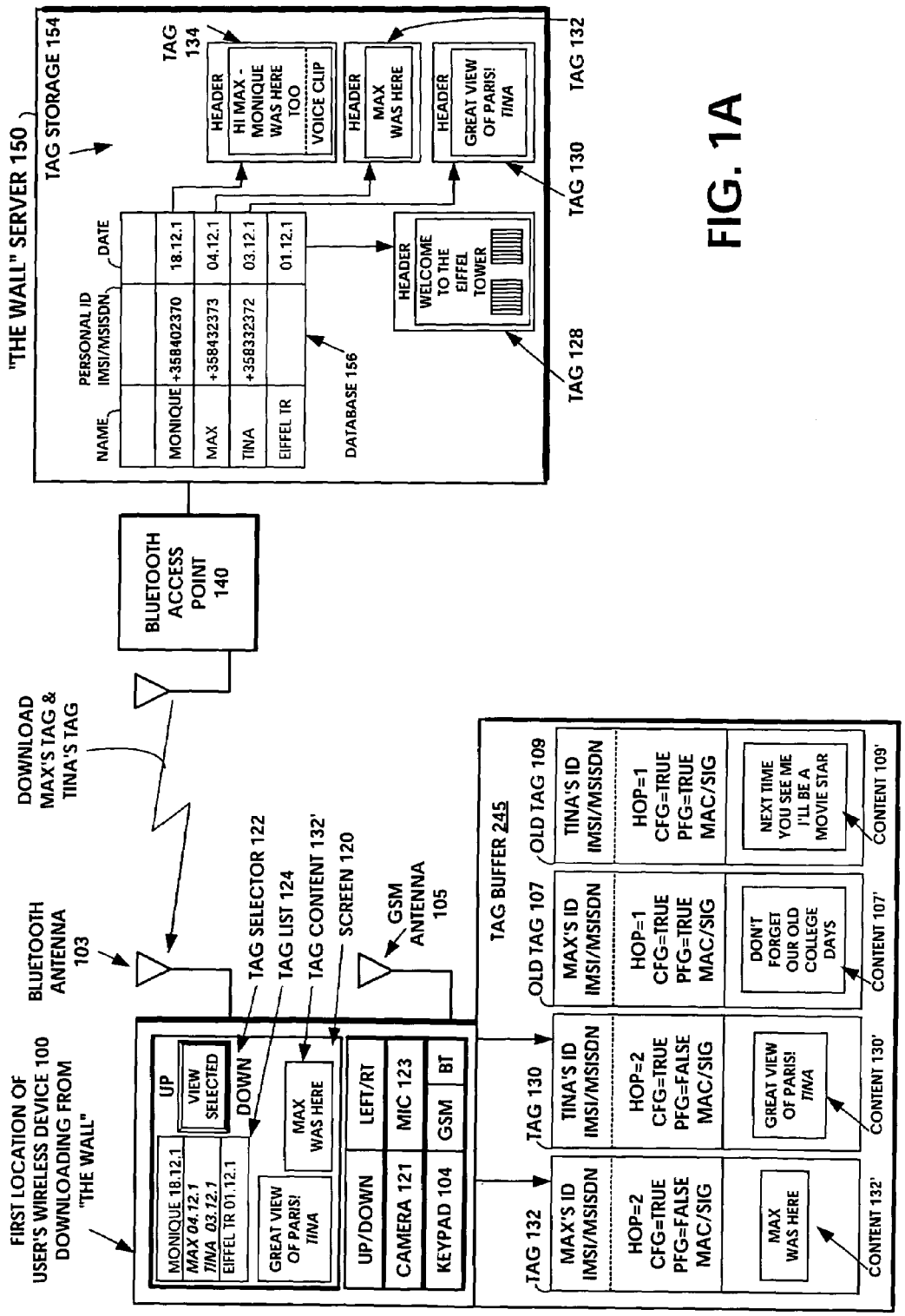
FIG. 1A illustrates the Bluetooth equipped cellular telephone downloading over the Bluetooth link selected tags 130 and 132 from "the wall" server, according to an embodiment of the present invention.

Alternately, the user can also perform a database search for tags using a query specifying particular IMSI or MSISDN values or user names. The database storage 156 in the server 150 includes database 158 that stores information about each tag in the server, in a tag record. The database 158 is shown in greater detail in FIG. 5. Each tag record includes fields for the information contained in the corresponding tag, to enable searches to be made on the author's name, IMSI or MSISDN identity, the hop count, the content-originator flag (CFG) value, the message authentication code (MAC) of the information in the tag, and the digital signature (SIG) of the author of the tag. Additional fields in the tag record include a time stamp when the tag was recorded in the server 150 and comment chain linking pointers to other tags in the server 150. In an alternate embodiment, the tag record includes a field for the two dimensional X,Y coordinates of the location of the tag in a virtual viewing space. The comment chain linking field contains pointers linking the tags forward or backward, if they are part of a sequence of user comments that have been recorded on "the wall". The tag storage 154 includes Tag 132, which includes Max's ID which is an IMSI or MSISDN identity. This data is contained in the personal ID field of a tag record in database 158 having a tag index field of "Tag 132". The tag storage 154 also includes Tag 130, which includes Tina's ID which is an IMSI or MSISDN identity. This data is contained in the personal ID field of a tag record in database 158 having a tag index field of "Tag 130". The user's query results in the return of a list 124, which is downloaded from the server 150, listing the tags stored in the server having the particular IMSI or MSISDN values or user names. FIG. 1A illustrates the Bluetooth equipped cellular telephone downloading selected tags 130 and 132 from "the wall" server, according to an embodiment of the present invention. FIG. 1A shows Max's tag 132 downloaded to device 100 and stored in its tag buffer 245. Note that the hop count value has been incremented by one when the tag was downloaded from the server 150. Also note that the person-to-person flag (PFG) value is "false". The multimedia content 132' is shown on the screen 120 of the device 100.

Tina's tag 130 downloaded to device 100 and stored in its tag buffer 245. Note that the hop count value has been incremented by one when the tag was downloaded from the server 150. Also note that the person-to-person flag (PFG) value is "false". The multimedia content 130' is also shown on the screen 120 of the device 100.

Figure 1B:
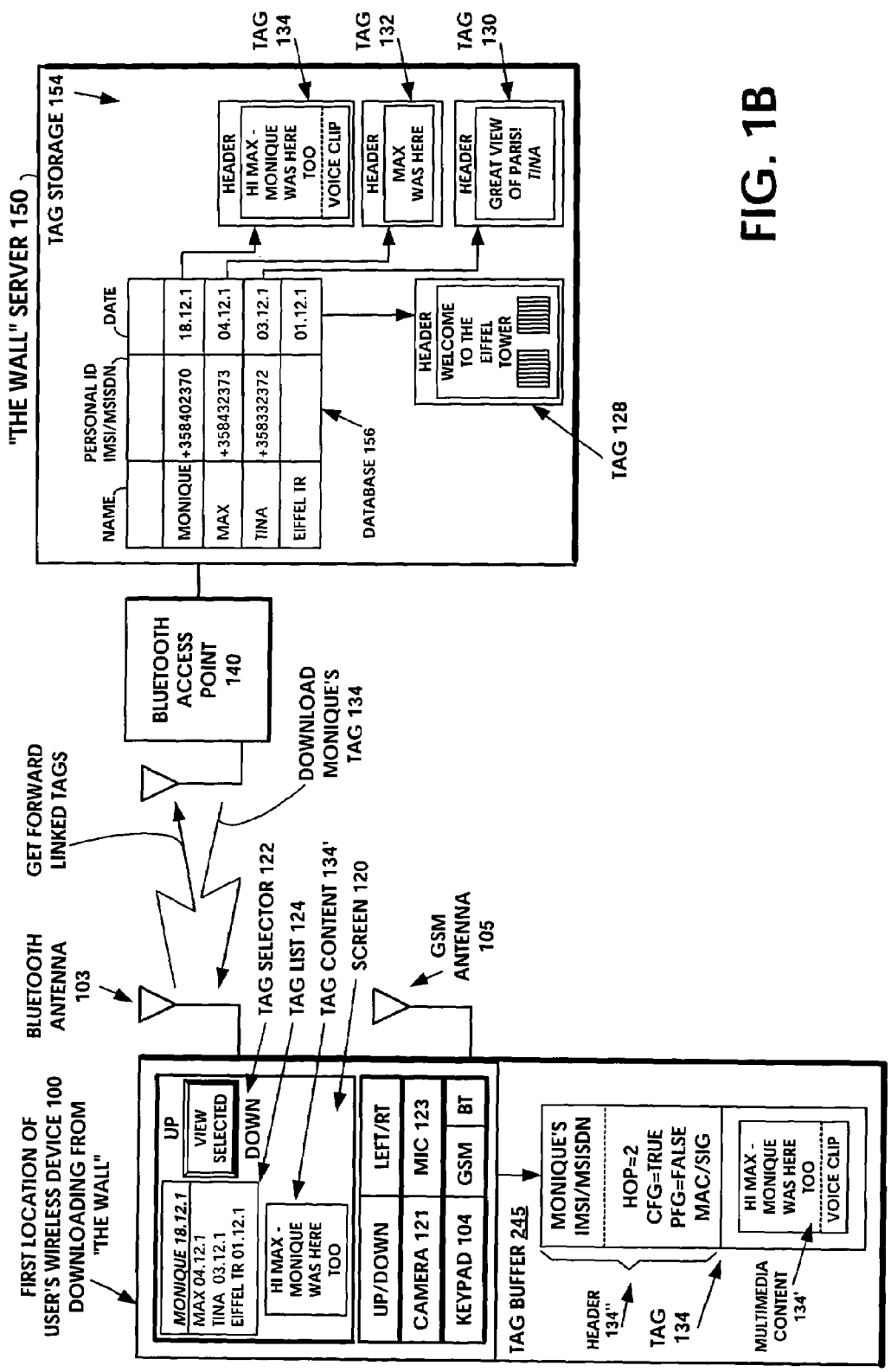
FIG. 1B illustrates the Bluetooth equipped cellular telephone downloading over the Bluetooth link a selected tag 134 from "the wall" server, according to an embodiment of the present invention. Tag 134 was found by using a forward pointer from the earlier tag 132, the forward pointer identifying the later tag 134 as part of a sequence of user comments that have been recorded on "the wall".

FIG. 1B illustrates the Bluetooth equipped cellular telephone downloading a selected tag 134 from "the wall" server, according to an embodiment of the present invention. The Bluetooth devices are in close proximity to one another and use the Bluetooth link to exchange tags. Tag 134 was found by using a forward link from the earlier tag 132, the forward link identifying the later tag 134 as part of a sequence of user comments that have been recorded on "the wall". The "comment chain link" field in database 158 contains pointers linking the tags forward or backward, if they are part of a sequence of user comments that have been recorded on "the wall". The row for Tag 132 includes a forward linking pointer "For_Link to Tag 134" to the row for Tag 134. Referring to server tag storage 154 of FIG. 4 and the database 158 of FIG. 5, Tag 134 was uploaded by its author, Monique, with a time stamp of 18.12.01, wherein its author designated that Tag 134 was a comment on Max's earlier tag 132, having a time stamp of 04.12.01. The designation of tag 134 as being a comment about Tag 132, is stored as the forward linking pointer "For_Link to Tag 134" in the row for Tag 132. A corresponding backward linking pointer "Bak_Link to Tag 132" was written by the server in the row for Tag 134. FIG. 1B shows the wireless device 100 sending a query "GET Forward Linked Tags", which results in the database 156 accessing Monique's tag 134, which is downloaded to device 100 and stored in its tag buffer 245. Note that the hop count value in the header 134" has been incremented by one when the tag was downloaded from the server 150. Also note that the person-to-person flag (PFG) value is "false". The multimedia content 134' is shown on the screen 120 of the device 100.

Figure 1C:
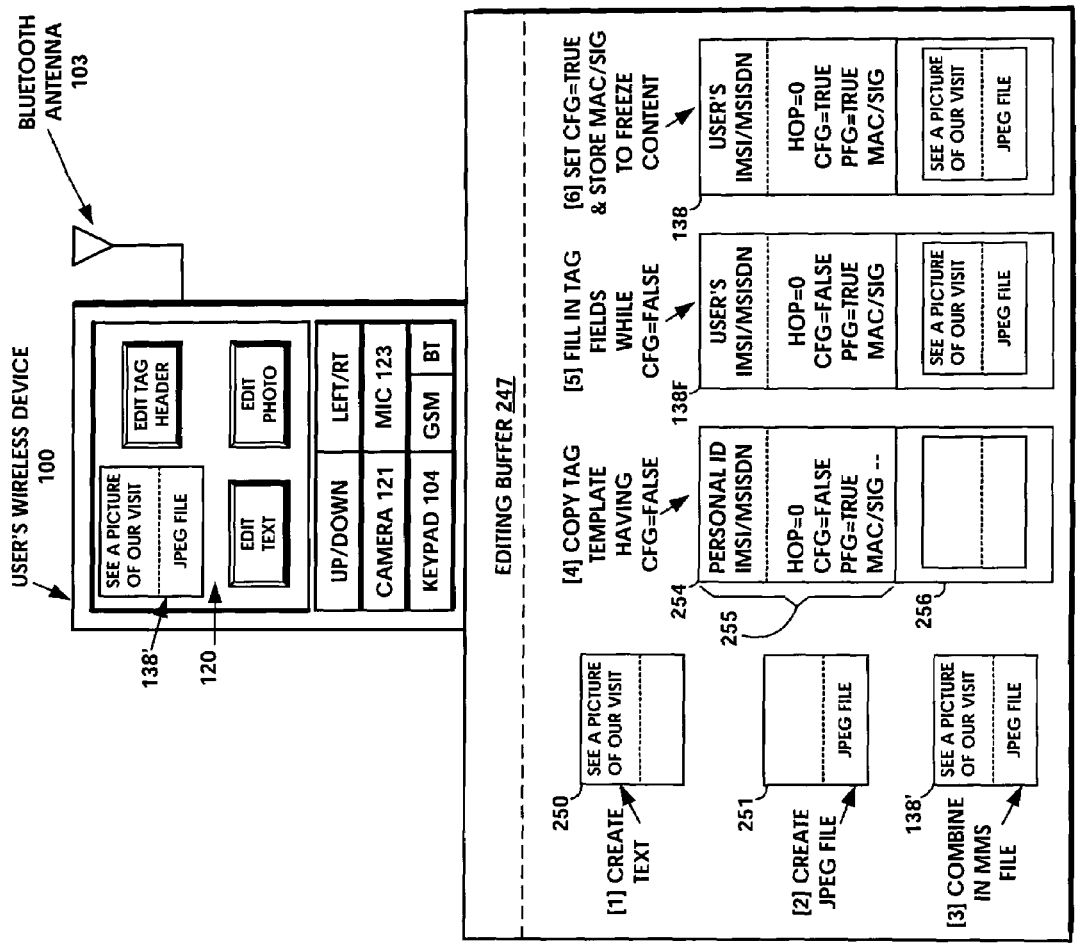
FIG. 1C illustrates the editing buffer 247 in the Bluetooth equipped cellular telephone, wherein a multimedia file 138' is created and then incorporated into a tag 138, according to an embodiment of the present invention.

FIG. 1C illustrates the editing buffer 247 in the Bluetooth equipped cellular telephone 100, wherein a multimedia content 138' is created and then incorporated into a tag 138, according to an embodiment of the present invention. A user can write text 250 in step (1), create a voice clip and append it to the text 250 and/or take a digital picture and compress it as a JPEG file 251 and append it to the text 250 in step (2), to create a multimedia file in step (3) as the content 138' of the tag 138. The creation or modifying of the multimedia content 138' can be done in the user's mobile wireless device 100 or off line and then stored in the mobile device 100. The multimedia content 138' is then incorporated into the tag or it can be referenced by a pointer in the tag. In FIG. 1C, a copy 254 is made of a tag template in step (4), having a header portion 255 and a content portion 256. The header portion specifies a personal ID field, which is filled with the identity of the author, a hop count field with a default value of zero, a content-originator flag (CFG) field with a default value of "false", a person-to-person flag (PFG) field with a default value of "true", a MAC field and a digital signature (SIG) field. The hop count always begins with a value of zero in the author's wireless device 100. The content-originator flag (CFG) field remains at a value of "false" during the period while the content portion 256 is being created or modified. The initial value of the person-to-person flag (PFG) is set to a value of "true". The person-to-person flag (PFG) value of "true" verifies that the tag has only been transferred from person-to-person, and has not been downloaded from "the wall" server. The MAC field and the digital signature (SIG) field are filled in, as described below. When the completed multimedia content is inserted into the portion 256 of the tag and when all of the fields of the portion 255 are completed in step (5), the content-originator flag (CFG) field is set to "true" in step (6), thereby freezing the content of the tag 138. Subsequent viewers of the content can make a copy of the content and can then modify it, but they cannot authentically attribute the modified copy to the original user.

The multimedia content 138' can be in the form of a multimedia messaging service (MMS) message, which is described in the 3GPP Technical Specification entitled *Multimedia Messaging Service (MMS) Functional Description*, TS 23.140, V5.1.0 (2001-12).

An example of the values inserted into the MAC field and the digital signature (SIG) field of the tag 138 is as follows, using the principles of public key encryption. A hash value is computed on the concatenated multimedia content 138' and the author's personal ID field, forming the message authentication code (MAC). In this example, it is not necessary to store the unencrypted MAC in the MAC field. Instead, the MAC value and a clear text copy of the author's ID are encrypted using the author's secret key, to form a digital signature (SIG), which is written into the digital signature (SIG) field of tag 138. The MAC is effectively incorporated into the tag in its encrypted (i.e., signed) form as the digital signature.

Later, the author's wireless device 100 delivers a copy of the tag 138 over the Bluetooth link to a second wireless device. The second wireless device decrypts the signed MAC using the author's public key, recovering the clear text author's ID and also recovering the MAC. If the recovered author's ID is readable, then the recipient is certain that the author originated the recovered MAC value. Then, to insure that the multimedia content 138' has not been altered since it was created by the author, the second wireless device computes a reference MAC. The reference MAC is a hash value computed on the concatenated multimedia content 138' and author's personal ID, both of which have been provided by the tag 138. The second wireless device compares the recovered MAC with the reference MAC and if the two MAC values are equal, then the receiving party knows that the multimedia content 138' has not been modified since it left the author's wireless device 100.

In an alternate embodiment, the expression "content-originator flag (CFG)=true" can also be included in the MAC. In this embodiment, a hash value is computed in the author's device 100 on the concatenated multimedia content 138' and the expression "content-originator flag (CFG) =true", forming the message authentication code (MAC). Then, the second wireless device decrypts the signed MAC using the author's public key, recovering the clear text expression "content-originator flag (CFG)=true" and also recovering the MAC. If the recovered expression "content-originator flag (CFG)=true" is readable, then the recipient is certain that the author originated the recovered MAC value and that the author's wireless device had set the content-originator flag (CFG) value to "true".

Methods to generate and evaluate message authentication codes to insure the integrity of data are described in the book by Stephen Thomas entitled *SSL and TLS*, published by John Wiley and Sons, 2000. Two example algorithms for message authentication are RSA's Message Digest (MD5) and the Secure Hash Algorithm (SHA), both of which are described in the book by Stephen Thomas. Another reference that goes into greater detail in its discussion of data integrity methods is the book by Bruce Schneier entitled *Applied Cryptography—2nd Edition* published by John Wiley and Sons, 1996. Methods to generate and evaluate digital signatures to authenticate the originating user as the source of the MAC (or other signed data), are described in the book by Richard E. Smith entitled *Internet Cryptography*, published by Addison Wesley, 1997.

The multimedia content 138' is artistic expression of its author and the tag 138 uniquely associates the author's identity with the multimedia content 138' by prohibiting alteration of the content after the author completes its creation or modification. Subsequent viewers of the content can make a copy of the content and can then modify it, but they cannot authentically attribute the modified copy to the original author.

When the original user has created the content in his/her mobile wireless device, a hop count value of zero is written into the tag. If the user uploads the tag to the server 150 and writes the tag on "the wall", the hop count is incremented by one. Whenever a later user downloads a copy of the tag from the server, the hop count is incremented again by one. When one user sends a copy of the tag over a Bluetooth link to another user, each transmission increments the hop count in the tag by one. This feature makes original copies of the content more valuable, as signified by a low hop count value in the tag.

Figure 1D:
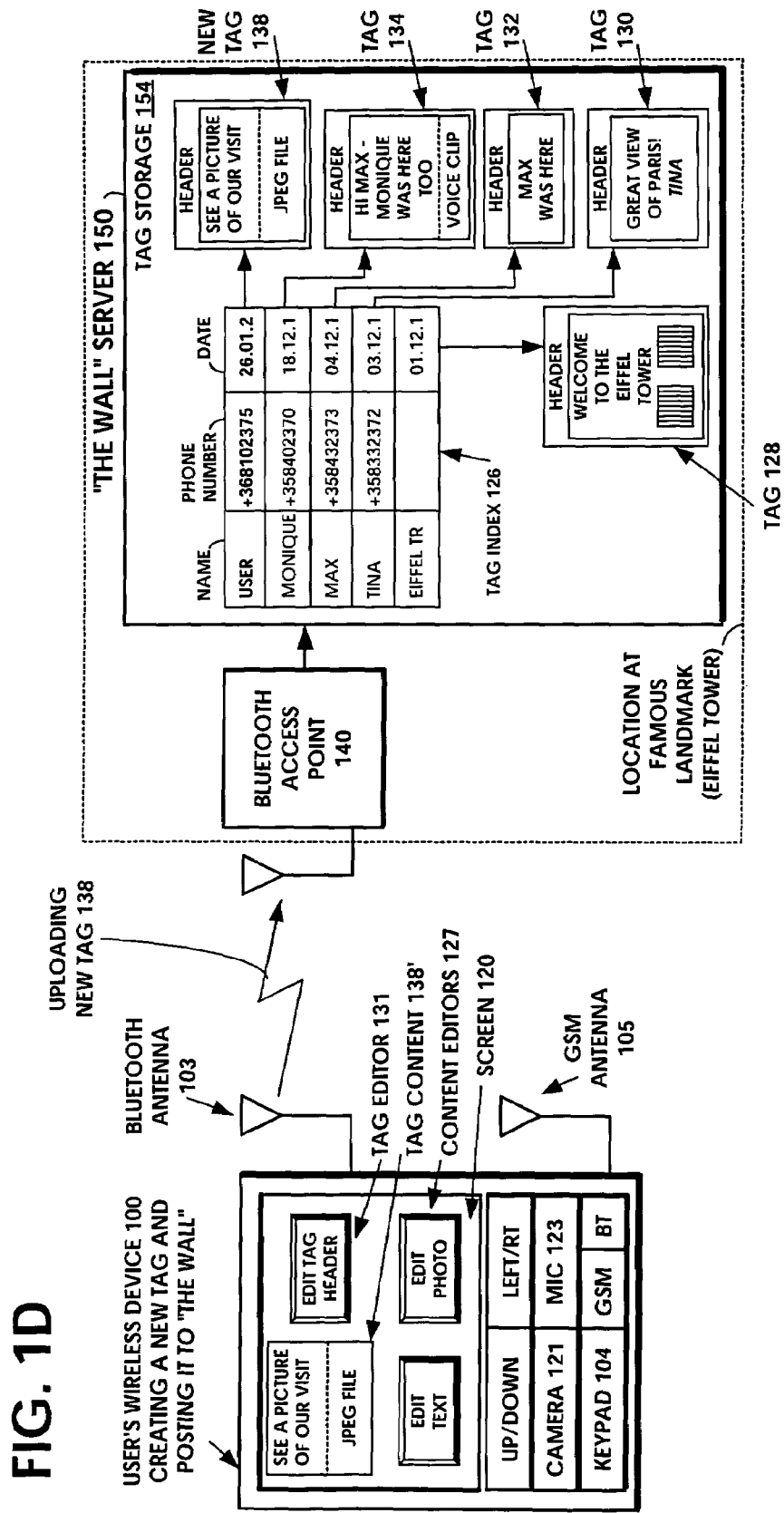
FIG. 1D illustrates the Bluetooth equipped cellular telephone uploading over the Bluetooth link the tag 138 to "the wall" server, to "paint the wall", according to an embodiment of the present invention.

A person-to-person flag (PFG) is also included in the tag. The initial value of the person-to-person flag (PFG) is set to a value of "true" when the originating user creates the tag. The person-to-person flag (PFG) value of "true" verifies that the tag has only been transferred from person-to-person, and has not been downloaded from "the wall" server. When the tag is uploaded to "the wall" server, the value of the person-to-person flag (PFG) is reset to a value of "false", and can never be returned to a value of "true". Thus, a tag directly received from a famous person, will have a person-to-person hop count of one, and thus be an item of value, similar to an original, famous autograph. As long as the tag is not transferred to "the wall" server, the person-to-person flag (PFG) value remains "true" and the tag has a greater value than it would if it had been obtained by downloading it from "the wall" server. Thus, a tag directly received from a famous person, will have a person-to-person hop count of one, and thus be an item of value, similar to an original, famous autograph. FIG. 1D illustrates the Bluetooth equipped cellular telephone uploading the tag 138 to "the wall" server, to "paint the wall", according to an embodiment of the present invention. The Bluetooth devices are in close proximity to one another and use the Bluetooth link to exchange tags.

In an alternate embodiment, when the user uploads a tag 138 to the server 150 and "paints the wall", the server will return the tag 128 that is a souvenir of visiting the location, such as "Welcome to the Eiffel Tower".

Figure 1E:
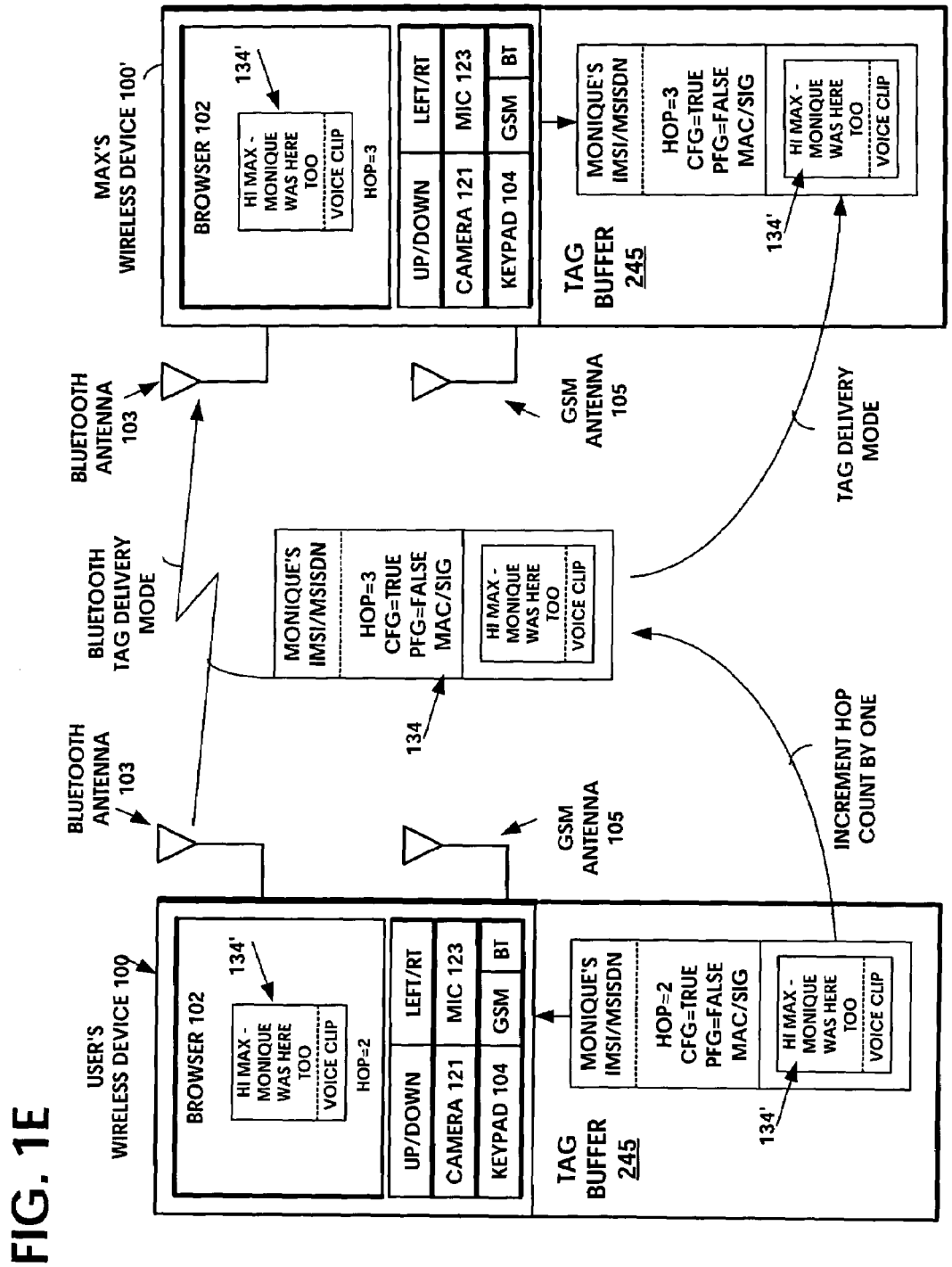
FIG. 1E illustrates the Bluetooth equipped cellular telephone 100 transferring the tag 134 over the Bluetooth link to a second Bluetooth equipped cellular telephone 100', using the "tag delivery" mode, whereby the sending user transfers a copy of the tag in the sender's device, causing the hop count to be incremented by one in the copy of the tag received by the recipient, according to an embodiment of the present invention.

FIG. 1E illustrates the Bluetooth equipped cellular telephone 100 transferring the tag 134 to a second Bluetooth equipped cellular telephone 100', using the "tag delivery" mode, whereby the sending user transfers a copy of the tag 134 in the sender's device 100, causing the hop count to be incremented by one in the copy of the tag received by the recipient's device 100', according to an embodiment of the present invention. The Bluetooth devices are in close proximity to one another and use the Bluetooth link to exchange tags. If the user has a Bluetooth equipped cellular telephone 100, he/she can transmit the multimedia content 134' of a tag 134 over a cellular telephone network to a cellular telephones capable of receiving multimedia files. However, the tags, themselves, cannot be transmitted in any other manner than over a short-range wireless link, such as a Bluetooth link. The user of a Bluetooth mobile device 100 must be close enough to another Bluetooth device 100' to directly communicate over the Bluetooth link in order to send a tag 134. The user must be at the location of the access point for the "wall" server 150 in order to "paint the wall" with his/her tag. The user must be at the location of his/her friend in order for his/her device 100 to deliver his/her tag to the friend's device 100'. This requirement of proximity between sender and receiver of a tag is imposed by the programmed operation of the Bluetooth devices, in accordance with the invention. There are two modes that the user can select from to transfer his/her tag to a friend. The first mode is a "tag delivery", whereby the sending user transfers a copy of the tag in the sender's device, causing the hop count to be incremented by one in the copy of the tag received by the recipient. The second mode is called "tag give-away", whereby the sending user transfers the tag currently in the sender's device, causing the hop count to remain unchanged in the tag received by the recipient. The sender effectively keeps a copy of the tag, and the copy in the sender's device is incremented by one. The person-to-person flag (PFG) value of "false" indicates that the tag has been downloaded from "the wall" server at some point after it was created.

Figure 1F:
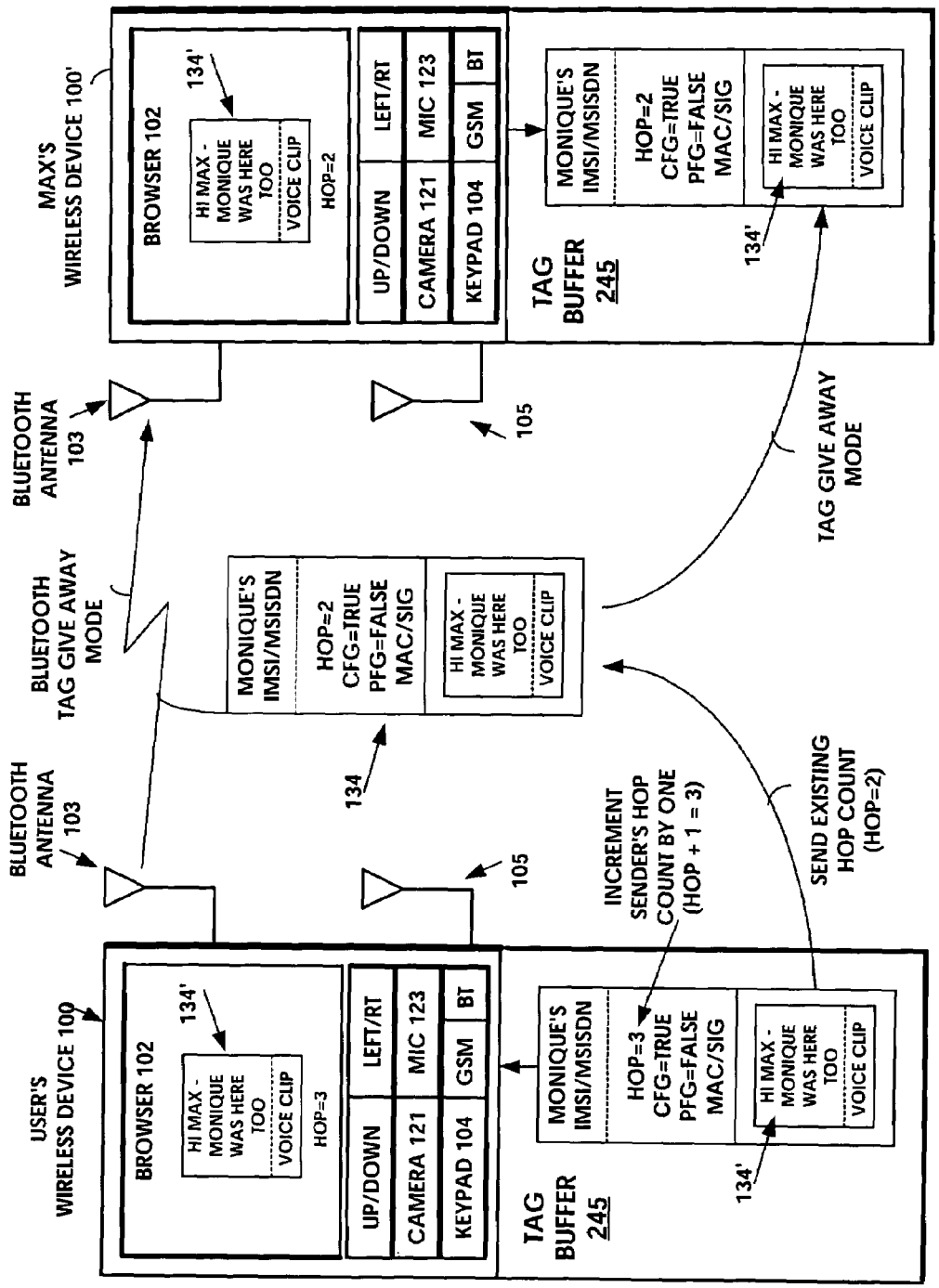
FIG. 1F illustrates the Bluetooth equipped cellular telephone 100 transferring the tag 134 over the Bluetooth link to the second Bluetooth equipped cellular telephone 100', using the "tag give-away" mode, whereby the sending user transfers the tag currently in the sender's device, causing the hop count to remain unchanged in the tag received by the recipient, according to an embodiment of the present invention. The sender effectively keeps a copy of the tag, and the copy in the sender's device is incremented by one.

FIG. 1F illustrates the Bluetooth equipped cellular telephone 100 transferring the tag 134 to the second Bluetooth equipped cellular telephone 100', using the "tag give-away" mode, whereby the sending user transfers the tag currently in the sender's device, causing the hop count to remain unchanged in the tag received by the recipient, according to an embodiment of the present invention. The Bluetooth devices are in close proximity to one another and use the Bluetooth link to exchange tags. The sender effectively keeps a copy of the tag, and the copy in the sender's device is incremented by one.

Figure 1G:
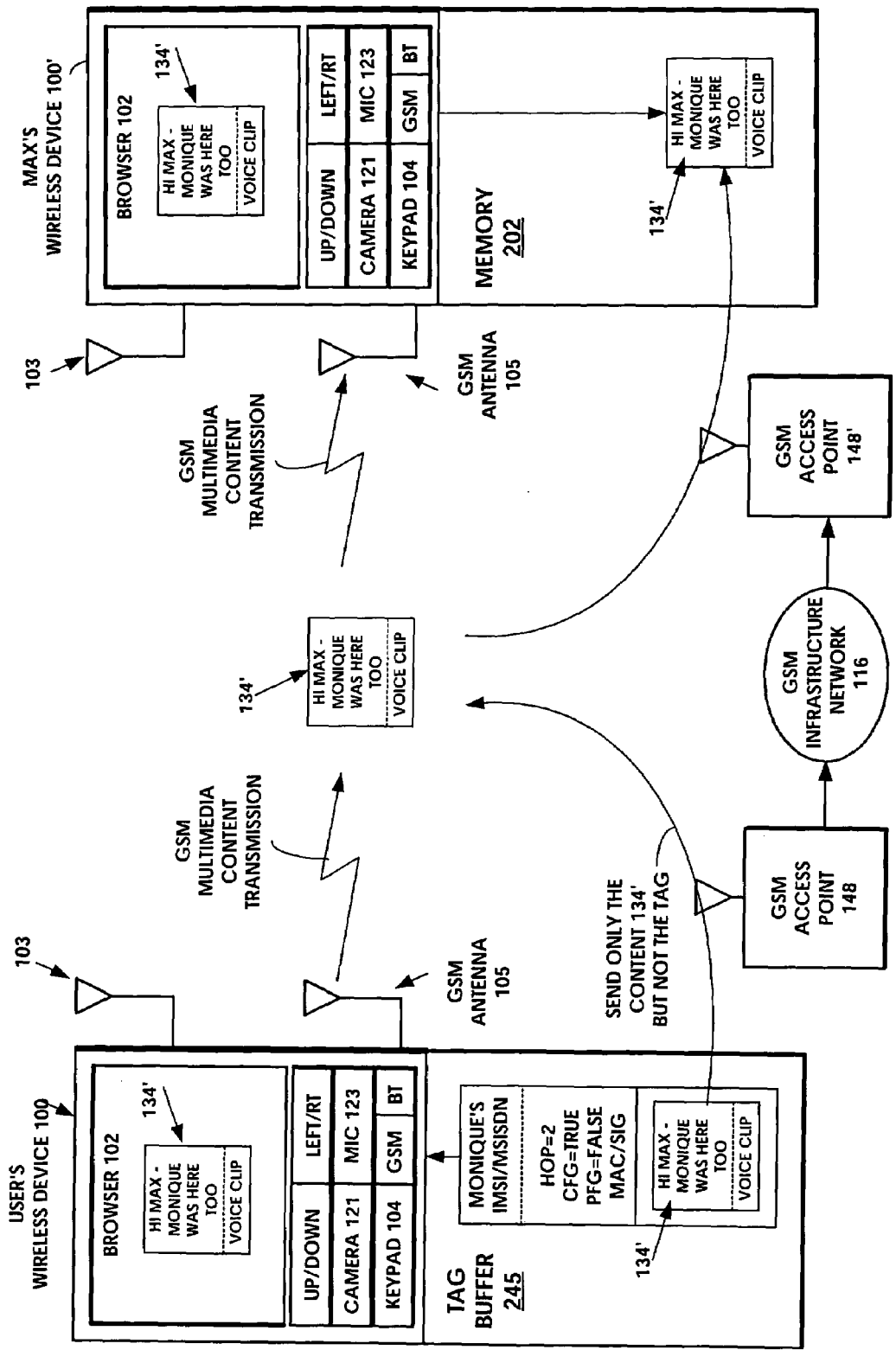
FIG. 1G illustrates the Bluetooth equipped cellular telephone 100 transferring over the cellular telephone network, the multimedia content 134' to the second Bluetooth equipped cellular telephone 100', according to an embodiment of the present invention.
Figure 1H:
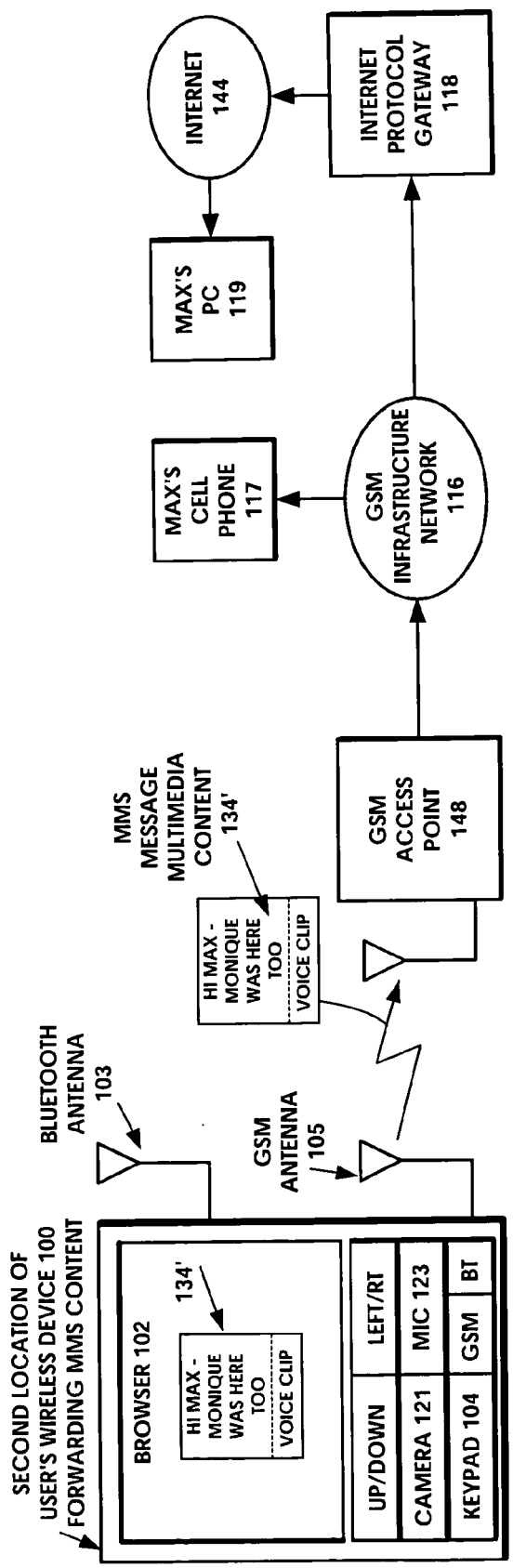
FIG. 1H illustrates the Bluetooth equipped cellular telephone 100 transferring over the cellular telephone network, the multimedia content 134' to either a cell phone or an Internet protocol gateway, according to an embodiment of the present invention.

FIG. 1G illustrates the Bluetooth equipped cellular telephone 100 transferring over the cellular telephone network, the multimedia content 134' to the second Bluetooth equipped cellular telephone 100', according to an embodiment of the present invention. The multimedia content 134' is extracted from the tag 134 in the user's device 100 and is transmitted via the GSM circuits 105 to the GSM access point 148 as a multimedia messaging service (MMS) message. The GSM access point 148 transfers the multimedia content 134' over the GSM infrastructure network 116 to the remote GSM access point 148', where it is transmitted to the second wireless device 100' via its GSM circuits 105. There the second wireless device 100' displays the multimedia content 134' on its browser 102 and stores it in its memory 202. FIG. 1H illustrates the Bluetooth equipped cellular telephone 100 transferring over the cellular telephone network 116, the multimedia content 134' to either a cell phone 117 or an Internet protocol gateway 118, the Internet 144, and the recipient's personal computer 119, according to an embodiment of the present invention.

Figure 2:
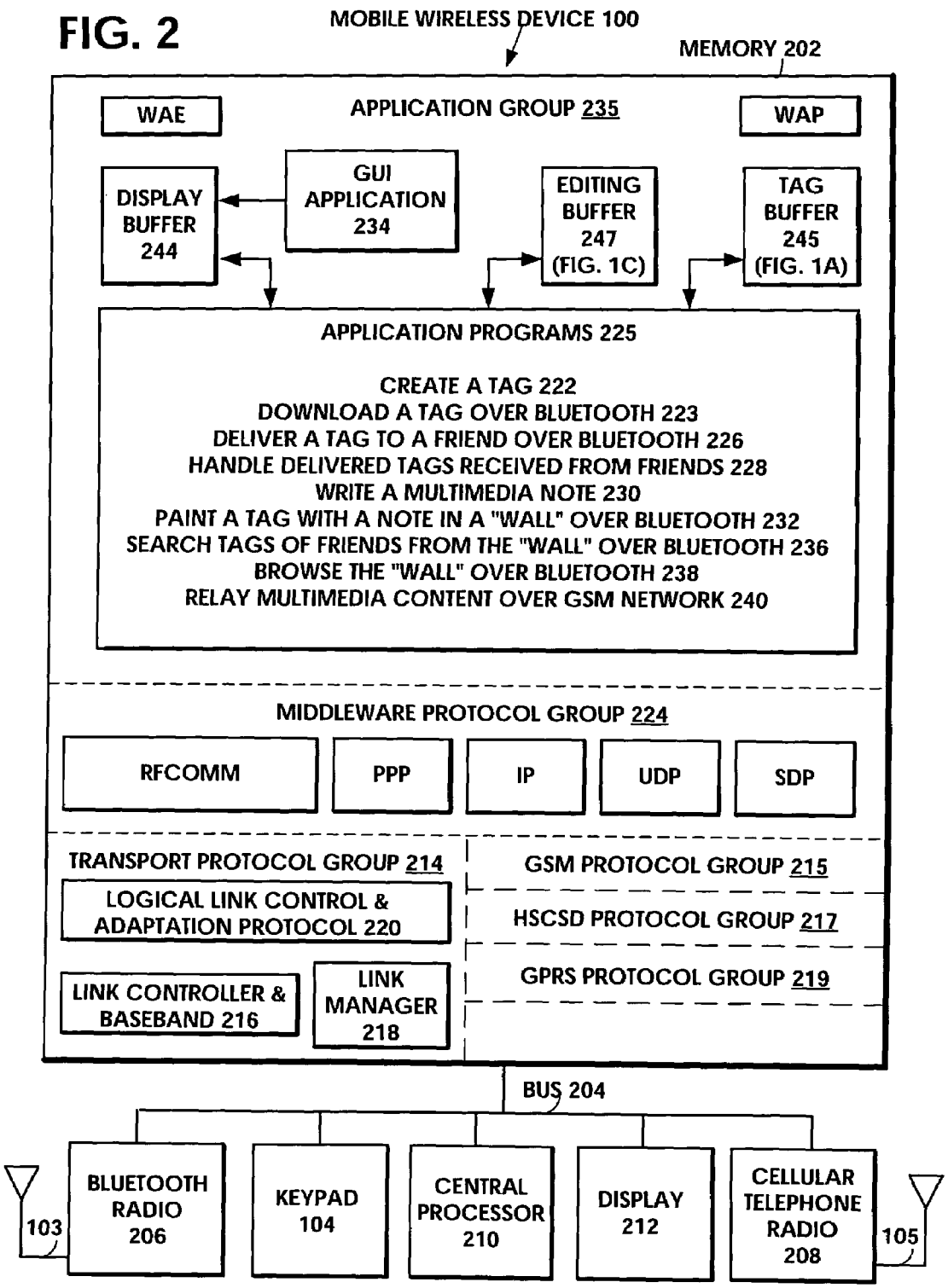
FIG. 2 illustrates the memory and components of the Bluetooth equipped cellular telephone 100, according to an embodiment of the present invention.

FIG. 2 illustrates the memory and components of the Bluetooth equipped cellular telephone 100, according to an embodiment of the present invention. The memory 202 is connected by the bus 204 to the Bluetooth radio 206, the keypad 104, the central processor 210, the display 212, and the cellular telephone radio 208. The memory 202 stores programs that are sequences of executable instructions which, when executed in the central processor 210, carry out the methods of the invention. The memory 202 includes the Bluetooth transport group 214 that includes the link controller 216, the link manager 218, and the logical link control and adaptation layer 220. The memory 202 also includes the GSM protocol group 215, the HSCSD protocol group 217, and the GPRS protocol group 219. The memory 202 also includes the Bluetooth middleware protocol group 224 that includes the RFCOMM, PPP, IP, UDP, and SDP program modules. The memory 202 also includes the application group 235 that includes the application programs 225. The application programs 225 include create a tag program 222, download a tag over Bluetooth program 223, deliver a tag to a friend over Bluetooth program 226, handle delivered tags received from friends program 228, write a multimedia note program 230, paint a tag with a note in a "wall" over Bluetooth program 232, search tags of friends from the "wall" over Bluetooth program 236, browse the "wall" over Bluetooth program 238, and relay multimedia content over GSM network program 240. The memory 202 also includes a display buffer 244, a GUI application 234, the editing buffer 247 (shown in FIG. 1C), the tag buffer 245 (shown in FIG. 1A), a wireless application protocol (WAP) module and a WAP application environment (WAE) module.

FIG. 2A is a flow diagram of the mobile wireless device communications processing method 500 in the applications programs 225 of the mobile wireless device 100. The steps in the flow diagram are as follows.

Step 502: Create new tag (FIG. 1C) or select tag from tag buffer (FIG. 1E, 1F, or 1G).

Step 504: Determine if the user has requested transmission over the short-range wireless link to step 505 or alternately over the cellular telephone link (FIG. 1G) to step 530.

Step 505: Determine if the user has requested transmission using the tag delivery mode (FIG. 1E) to step 506 or alternately, using the tag give away mode (FIG. 1F) to step 516.

Step 506: If the user has requested transmission using the tag delivery mode, then make a copy of the tag.

Step 508: increment hop count by one in the copy of the tag.

Step 510: Send the copy of the tag over the short-range wireless link.

Step 516: If the user has requested transmission using the tag give away mode, then make a copy of the tag.

Step 518: increment hop count by one in the original tag.

Step 520: Store and keep the copy of the tag with the incremented count.

Step 522: Send the original tag with the original count over the short-range wireless link.

Step 530: If the user has requested transmission over the cellular telephone link, then extract the multimedia content from the tag.

Step 532: Send only the multimedia content over the cellular telephone link.

FIG. 3 illustrates the memory and components of the "the wall" server 150, according to an embodiment of the present invention. The memory 302 is connected by the bus 304 to the Bluetooth access point 140, hard drive storage 306, the central processor 310, and the optional LAN adapter 308. The memory 302 stores programs, which are, sequences of executable instructions which, when executed in the central processor 310, carry out the methods of the invention. The memory 302 includes the operating system 316, the database manager system 318, the database storage 156 (shown in FIG. 5), the tag storage 154 (shown in FIG. 4), and the application programs 325. The application programs 325 include manage sending downloaded tag over Bluetooth program 323, manage receiving painted tag over Bluetooth program 332, manage searching tags over Bluetooth program 336, manage browsing over Bluetooth program 338, manage list view over Bluetooth program 340, and manage search options over Bluetooth program 342. The memory 302 also includes the I/O buffer 345.

Figure 3A:
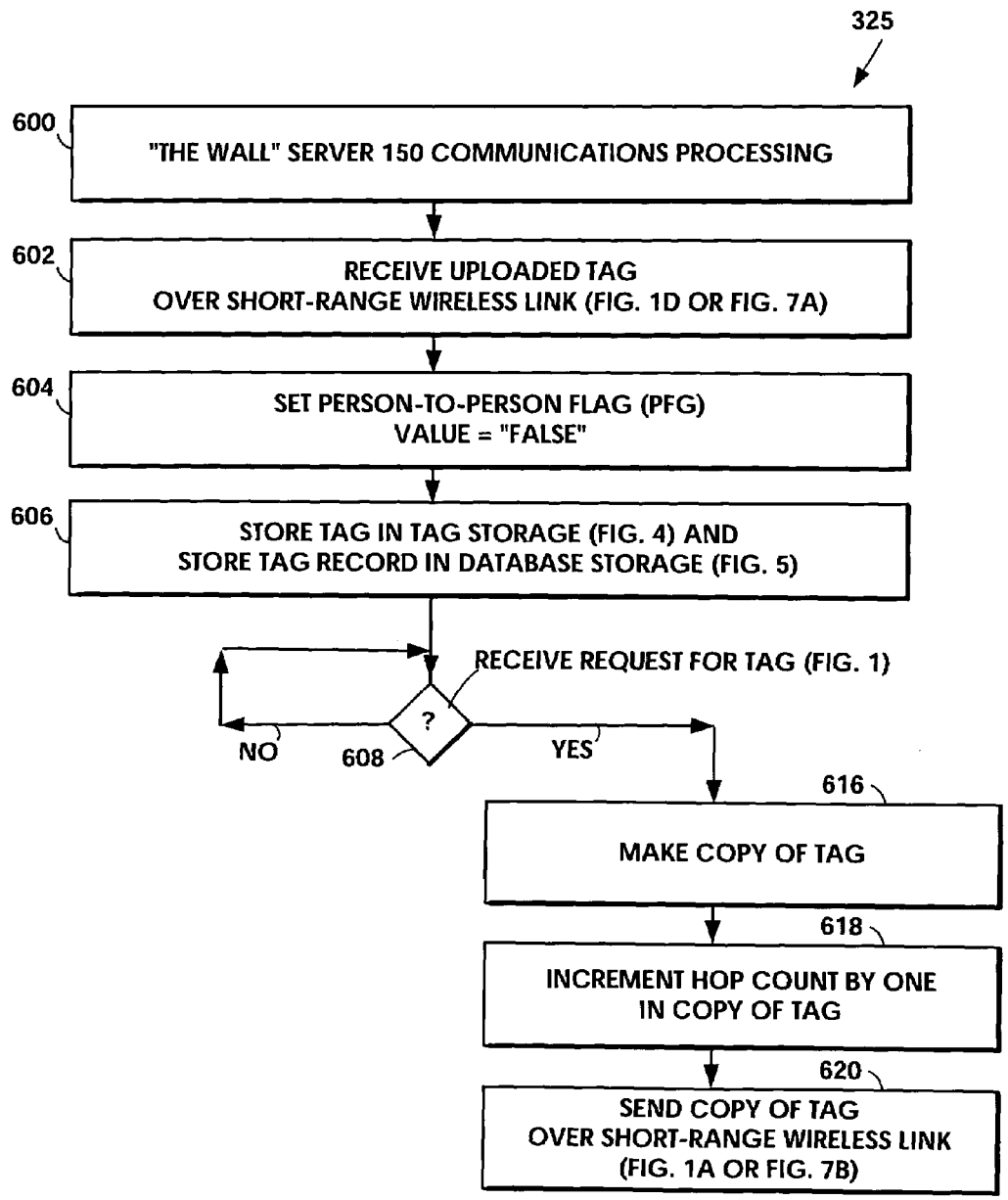
FIG. 3A is a flow diagram of "the wall" server communications processing method 600 in the applications programs 325 of "the wall" server 150.
Figure 7A:
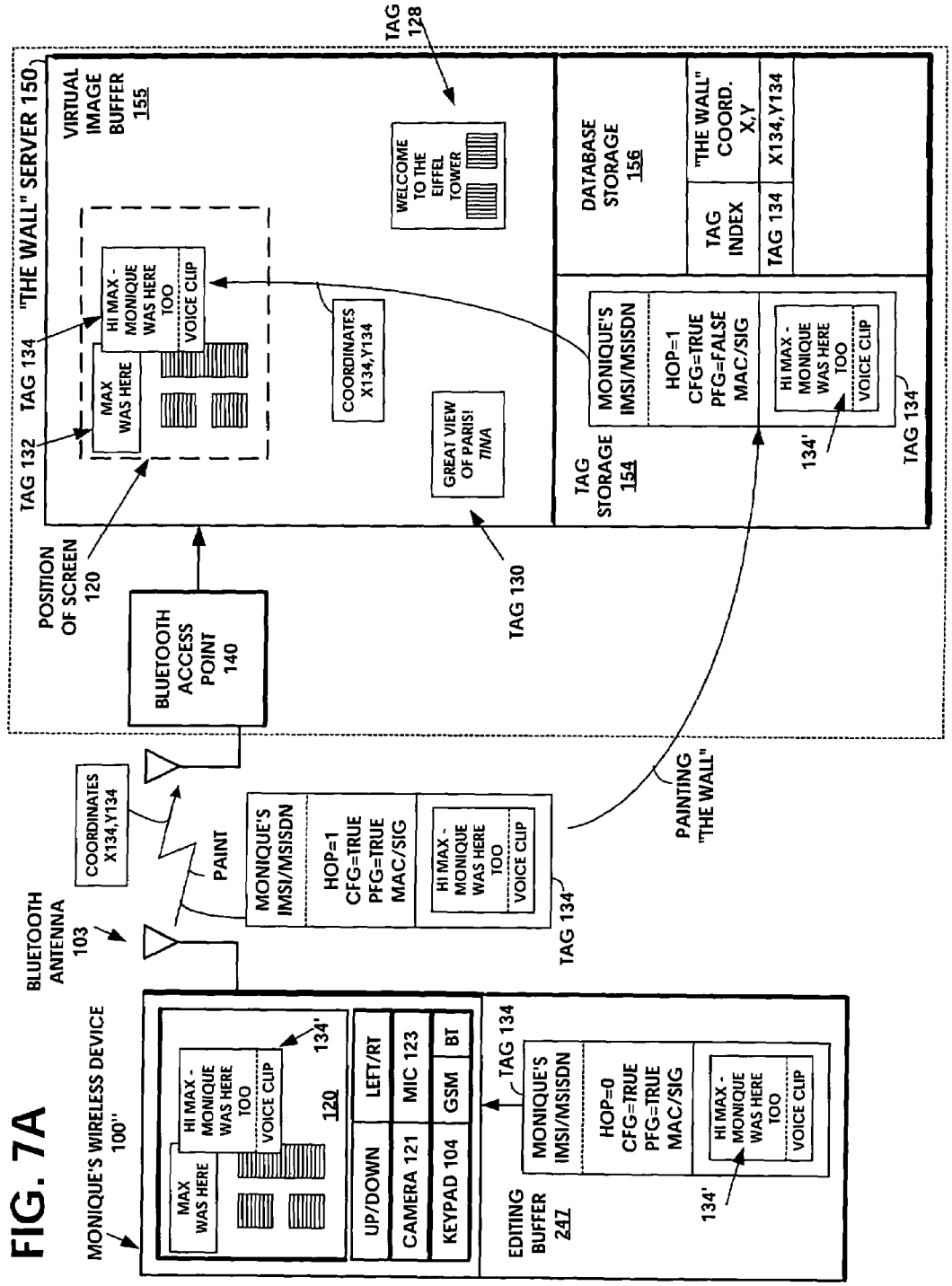
FIG. 7A illustrates a Bluetooth equipped cellular telephone 100" uploading the tag 134 over the Bluetooth link to "the wall" server, to "paint the wall", in the alternate embodiment of the invention, according to an embodiment of the present invention.

FIG. 3A is a flow diagram of "the wall" server communications processing method 600 in the applications programs 325 of "the wall" server 150. The steps in the flow diagram are as follows:

Step 602: Receive an uploaded tag over the short-range wireless link (FIG. 1D or FIG. 7A).

Step 604: Set the person-to-person flag (PFG) to the value of "false".

Step 606: Store the tag in the tag storage (FIG. 4) and store the tag record for the tag in the database storage (FIG. 5).

Step 608: Determine if a request has been received for the tag over the short-range wireless link (FIG. 1).

Step 616: If a request has been received for the tag over the short-range wireless link, then make a copy of the tag.

Step 518: Increment hop count by one in the copy of the tag.

Step 510: Send the copy of the tag over the short-range wireless link (FIG. 1A or FIG. 7B).

Figure 6A:
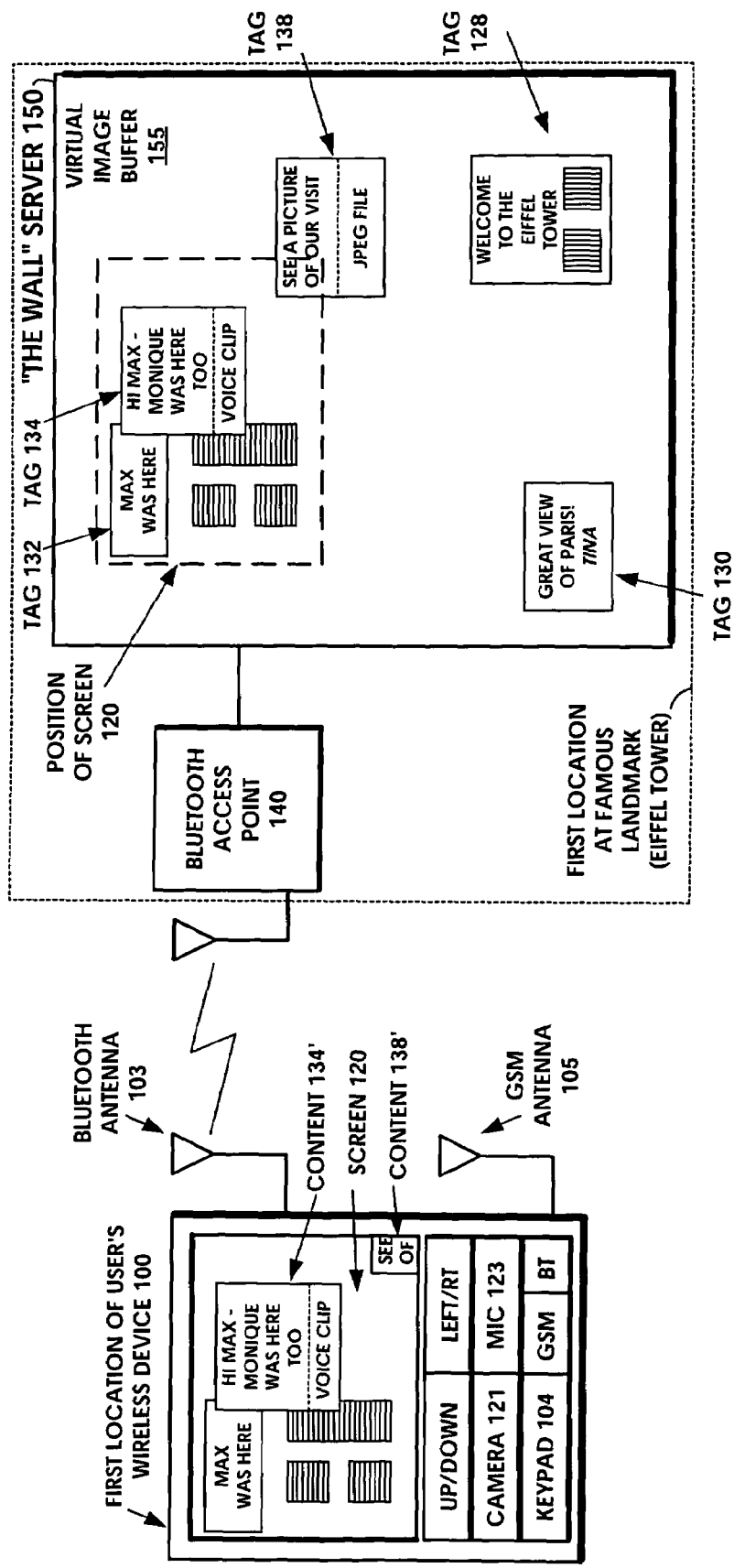
FIG. 6A illustrates an alternate embodiment of the invention, with the Bluetooth equipped cellular telephone 100 browsing over the Bluetooth link for tags in "the wall" server 150, according to an embodiment of the present invention. The server 150 is programmed to store the tags in association with two dimensional X,Y coordinates, in a virtual viewing space. A user can browse tags that have been posted on "the wall", by using up/down and left/right controls of the user's Bluetooth device.

FIG. 6A illustrates an alternate embodiment of the invention, with the Bluetooth equipped cellular telephone 100 browsing for tags in "the wall" server 150. The Bluetooth devices are in close proximity to one another and use the Bluetooth link to exchange tags. The server 150 is programmed to store the tags in association with two dimensional X,Y coordinates, in a virtual viewing space shown in FIG. 6B. Each tag is given a position in the coordinate system at the time it is uploaded and stored in the server 150. The X,Y coordinates of a tag are with respect to the origin of coordinates X,Y X0,Y0. For example, the X,Y coordinates of the tag 134 are X,Y X134,Y134 with respect to the origin of coordinates X,Y X0,Y0. These coordinates are stored in the tag record 134 of the database 158 of FIG. 5. The X,Y coordinates of the screen 120 of the wireless device 100 of FIG. 6A are X,Y X120,Y120 with respect to the origin of coordinates X,Y=X0,Y0. As the user browses tags that have been posted on "the wall" server, he appears to move the viewing area of the screen 120 with respect to the origin of coordinates X,Y=X0,Y0 by using up/down and left/right controls of the user's Bluetooth device. The screen's position coordinates X120,Y120 are incremented or decremented as the user presses the up/down and left/right controls, causing the viewing area to pass over and include those tags whose X,Y coordinates are within the viewing area of the screen. A user can browse tags that have been posted on "the wall", by using up/down and left/right controls of the user's Bluetooth device 100.

Figure 6B:
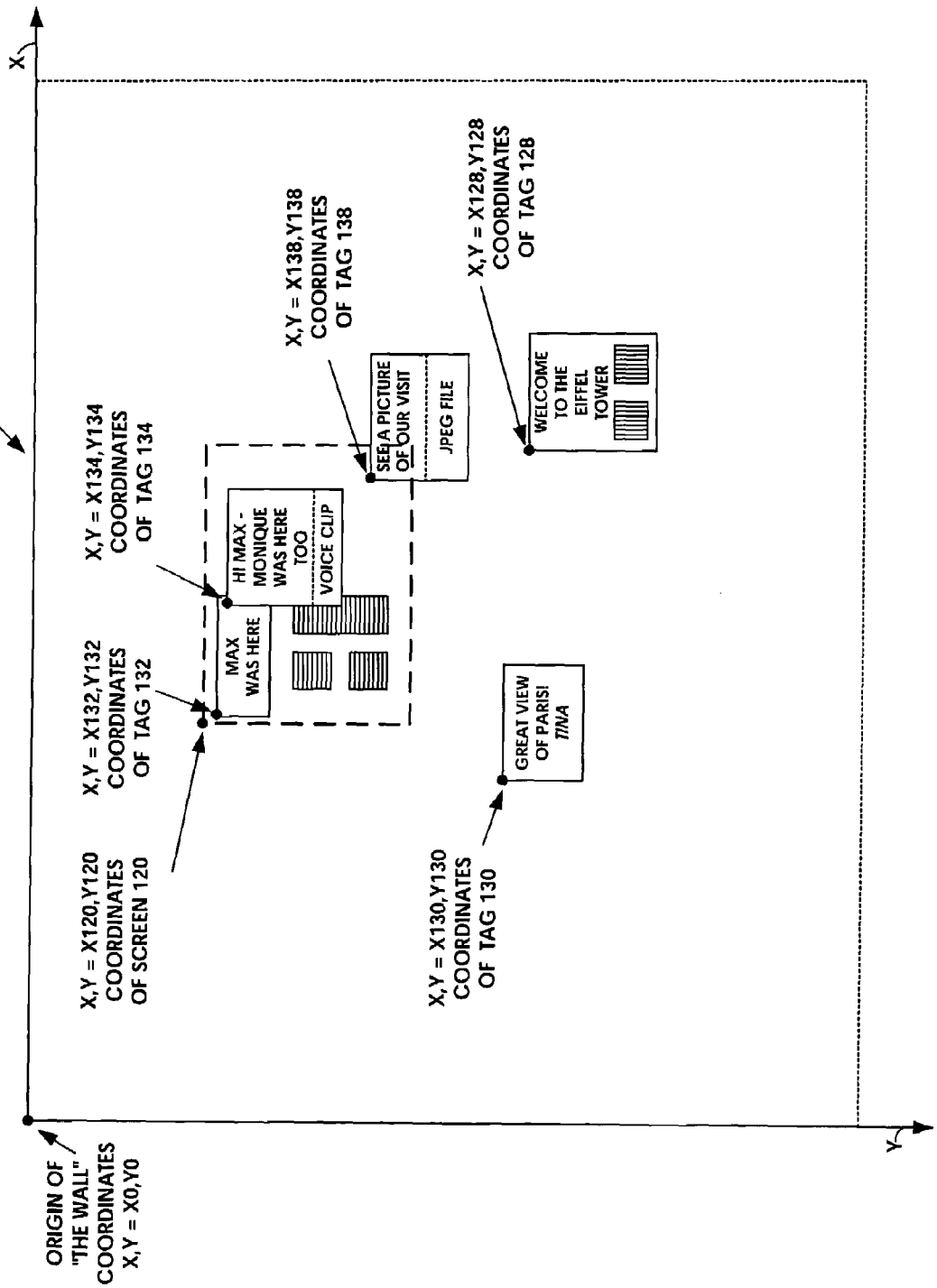
FIG. 6B illustrates the virtual, two-dimensional viewing space in the alternate embodiment of the invention, according to an embodiment of the present invention.

FIG. 7A illustrates Monique's Bluetooth equipped cellular telephone 100" uploading her tag 134 to "the wall" server 150, to "paint the wall" at a position X134,Y134 of the virtual viewing space shown in FIG. 6B, according to an embodiment of the present invention. Monique uploads her tag 134 on a first occurring day. Note that the person-to-person flag (PFG) has a value of "true" in Monique's wireless device 100'. When the server 150 receives the tag 134, it resets the person-to-person flag (PFG) to a value of "false", indicating that the tag 134 has been uploaded to a "wall" server at some time in its life. The database 158 in the server 150 adds a tag record with a tag index for tag 134. The tag record includes Monique's name and IMSI or MSISDN identity value +358402370, the hop count=1, the content-originator flag (CFG) value=true, the message authentication code (MAC) of the information in the tag 134, and the digital signature of Monique. Additional fields in the tag record include a time stamp 18.12.01 when the tag was recorded in the server 150. The tag record includes a field for the two dimensional X,Y coordinates X134,Y134 of the location of the tag 134 in a virtual viewing space of FIG. 6B. Tag 134 is uploaded by its author, Monique, with a time stamp of 18.12.01, wherein Monique designates that Tag 134 is a comment on Max's earlier tag 132, having a time stamp of 04.12.01. The designation of tag 134 as being a comment about Tag 132, is stored as the forward linking pointer "For_Link to Tag 134" in the record for Tag 132. A corresponding backward linking pointer "Bak_Link to Tag 132" is written by the server in the record for Tag 134. FIG. 7B illustrates the user's Bluetooth equipped cellular telephone 100 downloading tag 134 from "the wall" server, on a later day 26.01.02, according to an embodiment of the present invention. Note that the hop count value has been incremented by one when the tag was downloaded from the server 150. Also note that the person-to-person flag (PFG) has a value of "false", indicating that the tag 134 has been downloaded from a "wall" server at some time in its life.

Figure 8:
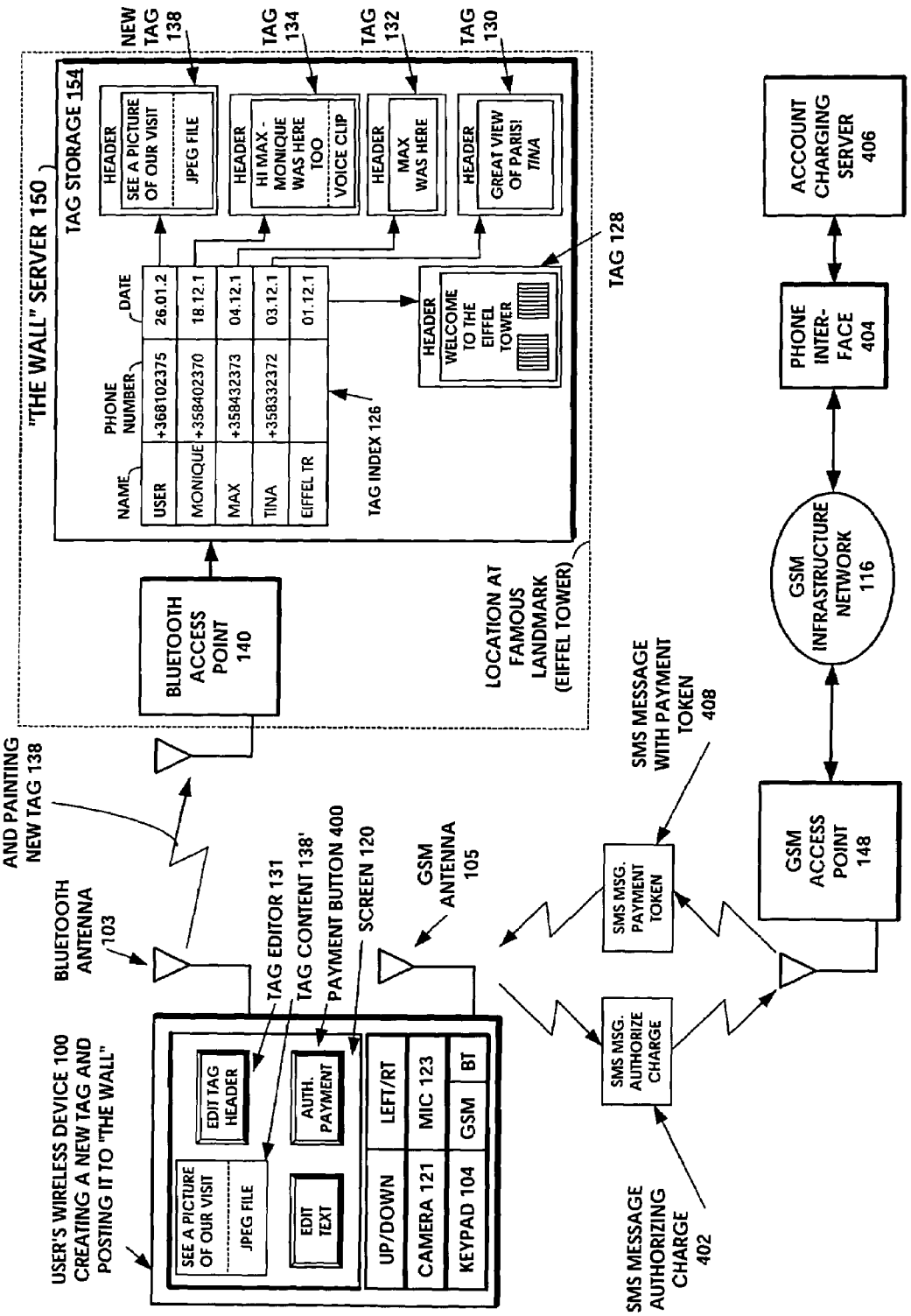
FIG. 8 illustrates another alternate embodiment of the invention, wherein payment is required before user's device 100 is allowed to upload a tag 138 over the Bluetooth link to "paint the wall" of the server 150, according to an embodiment of the present invention. The Bluetooth equipped cellular telephone 100 sends an SMS charge authorizing message over the cellular telephone system to an account-charging server, authorizing the account to be charged. The account-charging server returns an SMS payment token to the user's device over the cellular telephone system.

FIG. 8 illustrates another alternate embodiment of the invention, wherein payment is required before user's device 100 is allowed to upload a tag 138 to "paint the wall" of the server 150. The Bluetooth devices are in close proximity to one another and use the Bluetooth link to exchange tags. The Bluetooth equipped cellular telephone 100 sends an SMS charge authorizing message 402 over the GSM cellular telephone access point 148, GSM infrastructure network 116, and telephone interface 404 to an account charging server 406, authorizing the account to be charged. The account charging server 406 returns an SMS payment token 408 over the cellular telephone network to the user's device 100.

Figure 9:
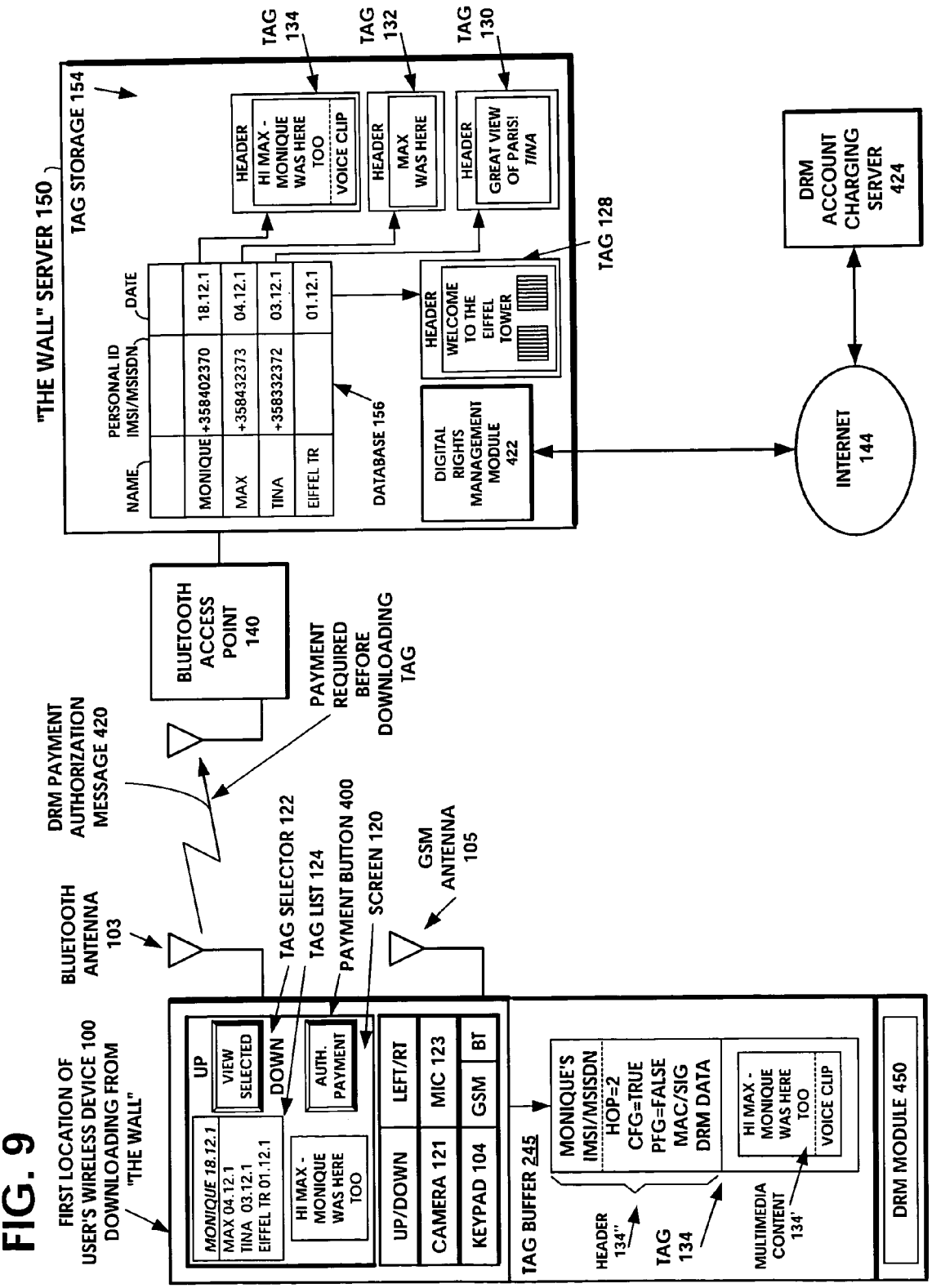
FIG. 9 illustrates another alternate embodiment of the invention, wherein payment is required before a user is allowed to download a tag over the Bluetooth link from the "the wall" server, according to an embodiment of the present invention. A digital rights management (DRM) authorization message is sent by the user's device 100 over the Bluetooth link to "the wall" server 150. A DRM module 422 in the server 150 is connected over a network such as the Internet, to a DRM account-charging server 424. The DRM account charging server handles the necessary steps in debiting the user's account, and then returns an enabling signal to "the wall" server. "The wall" server then downloads over the Bluetooth link, the tag requested by the user.

FIG. 9 illustrates another alternate embodiment of the invention, wherein payment is required before a user is allowed to download a tag 134 from the "the wall" server 150. The Bluetooth devices are in close proximity to one another and use the Bluetooth link to exchange tags. A digital rights management (DRM) authorization message 420 is prepared in the DRM module 450 in the user's device 100 and is sent by the user's device over the Bluetooth link to "the wall" server 150. A DRM module 422 in the server 150 is connected over a network such as the Internet 144, to a DRM account charging server 424. The DRM account charging server 424 handles the necessary steps in debiting the user's account, and then returns an enabling signal to "the wall" server 150. The digital rights management (DRM) module 422 in "the wall" server 150 creates a secure environment in the memory 302 of the server 150, within which the data rights information associated with the tag 134 can be securely written in the "DRM Data" field of the tag 134. The digital rights management (DRM) module 422 in "the wall" server 150 enters the "Paid" status and additional data rights information in the "DRM Data" field of the tag 134. The multimedia content 134' can optionally be encrypted by the module 422. "The wall" server 150 then downloads the tag over the Bluetooth link as requested by the user's device 100. The DRM module 450 in the user's device 100 creates a secure environment in the memory 202 of the device 100, within which the data rights associated with the tag 134 can be implemented. The DRM data in the tag 134 read by the DRM module 450, includes rules imposed by its author, Monique, regarding how the tag 134 may be distributed. The rules can include restrictions on copying, transfer, payment for copies, time span allowed for distribution, conditions for distribution of trial samples, allocation of royalties to middleman distributors, and the like. If multimedia content 134' was optionally encrypted by the server 150, then the DRM module 450 in the user's device 100 decrypts the multimedia content 134' and permits its display on the screen 120. Additional description of the principles of digital rights management (DRM) can be found in the book by Bill Rosenblatt, et al., entitled *Digital Rights Management: Business and Technology*, published by Professional Mindware, 2001.

Figure 10:
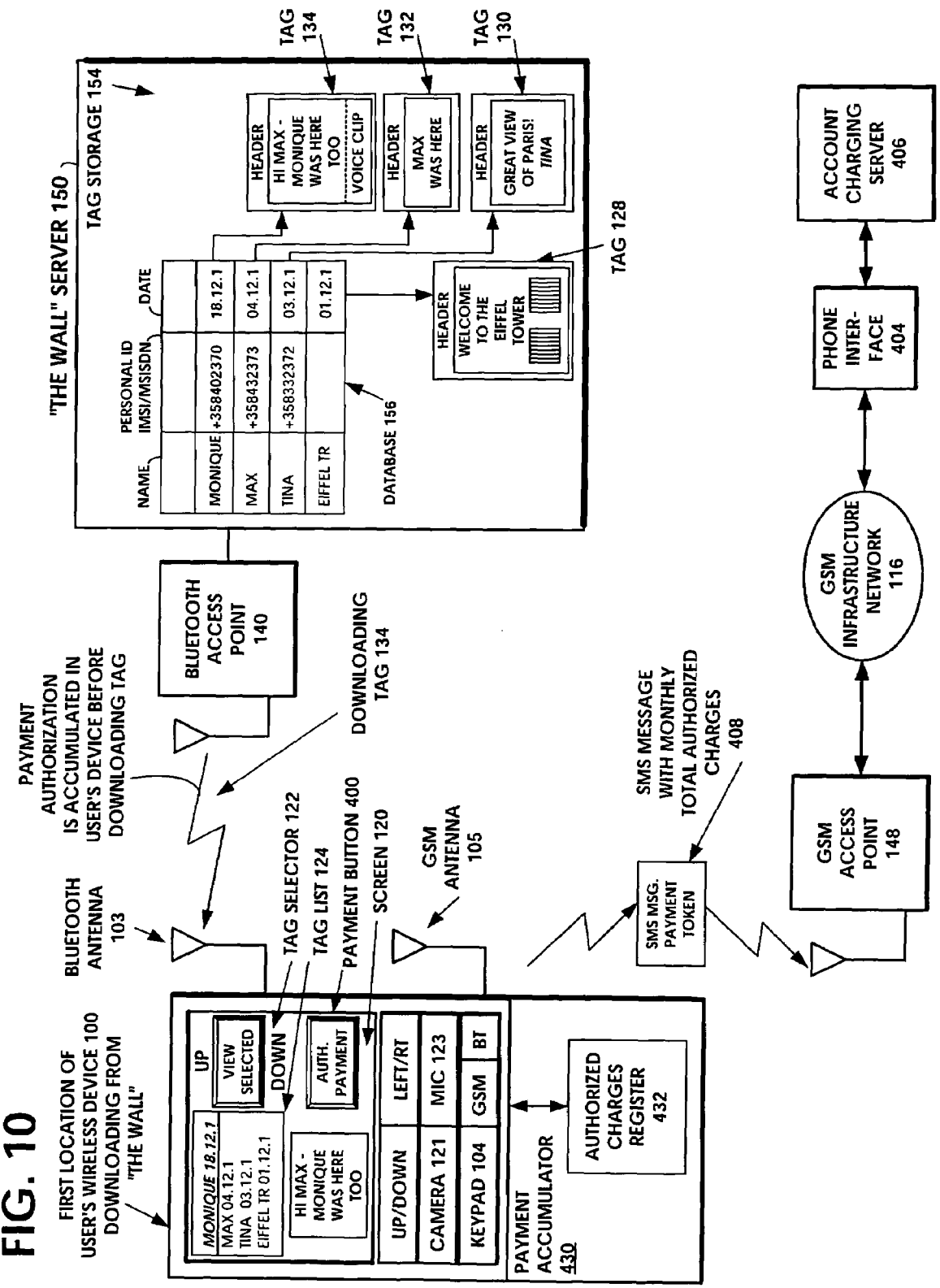
FIG. 10 illustrates another alternate embodiment of the invention, wherein payment is required before a user is allowed to download a tag over the Bluetooth link from the "the wall" server, according to an embodiment of the present invention. A payment accumulator 430 is included in the user's device 100, that accumulates authorized charges for downloading a plurality of tags from one or many "wall" servers 150, etc. over an extended period, such as a month. At the end of the month, the Bluetooth equipped cellular telephone 100 sends an SMS message containing the monthly total authorized charges, sending it over the cellular telephone system to an account-charging server 406, authorizing the account to be charged.

FIG. 10 illustrates another alternate embodiment of the invention, wherein payment is required before a user is allowed to download a tag from the "the wall" server 150. The Bluetooth devices are in close proximity to one another and use the Bluetooth link to exchange tags. A payment accumulator 430 is included in the user's device 100, that accumulates authorized charges in a register 432 for downloading a plurality of tags from one or from many "wall" servers 150, etc. over an extended period, such as a month. At the end of the month, the Bluetooth equipped cellular telephone 100 sends an SMS message 408 containing the monthly total authorized charges, sending it over the cellular telephone system 148, 116, and 404 to an account charging server 406, authorizing the user's account to be charged.

Figure 11:
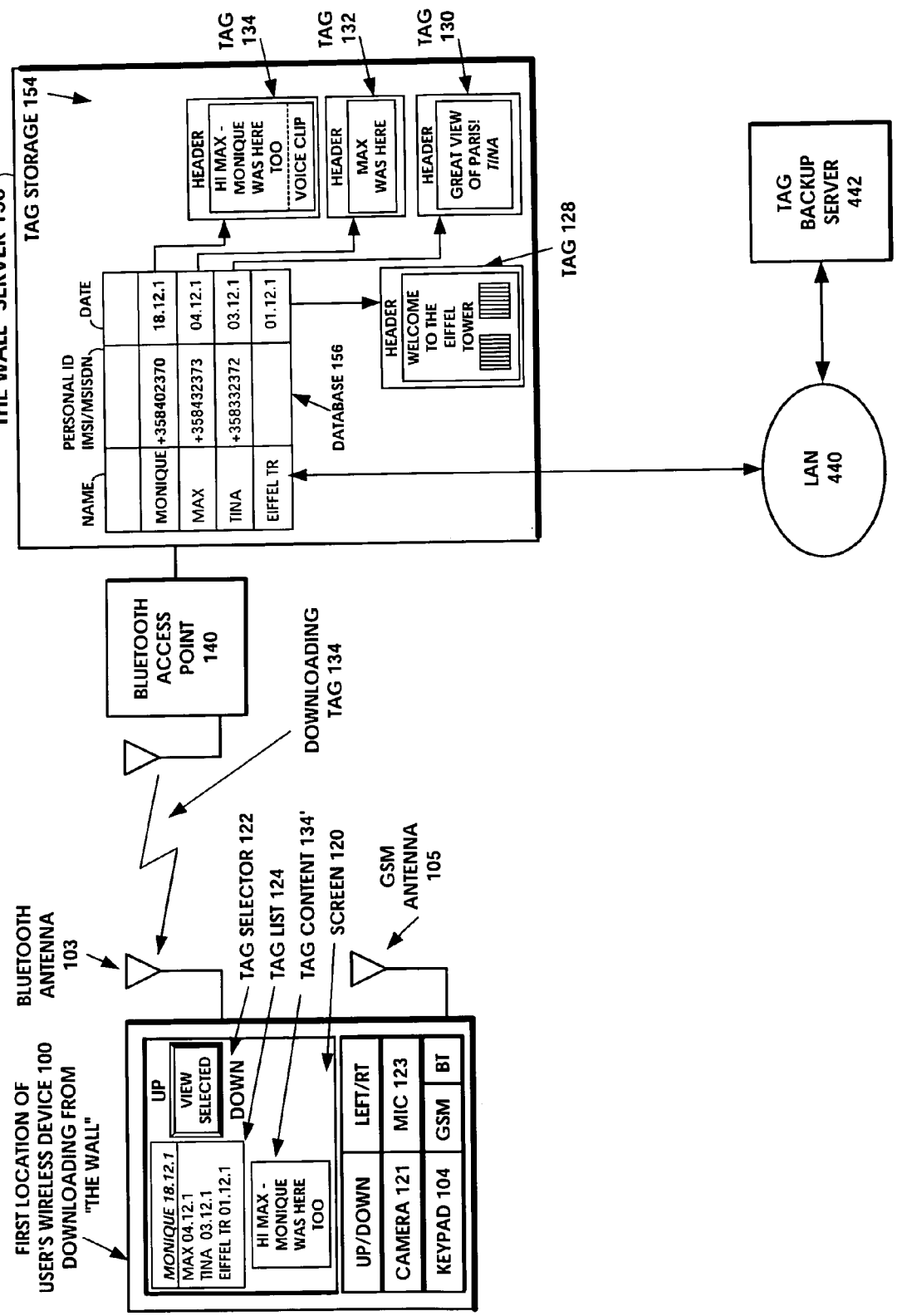
FIG. 11 illustrates another alternate embodiment of the invention, wherein "the wall" server 150 is connected to a remote, backup server 442 that stores a copy of all of the tags and the database, to be used in the event of disaster recovery, according to an embodiment of the present invention. Additionally, the backup server 442 provides an accessible, bulk storage for old tags, to reduce the storage requirements on "the wall" server 150.

FIG. 11 illustrates another alternate embodiment of the invention, wherein "the wall" server 150 is connected over a LAN 440 to a remote, backup server 442 that stores a copy of all of the tags 128, 130, 132, and 134 and the database 156/158, to be used in the event of disaster recovery. Additionally, the backup server 442 provides an accessible, bulk storage for older tags, to reduce the storage requirements on "the wall" server 150.

Figure 12:
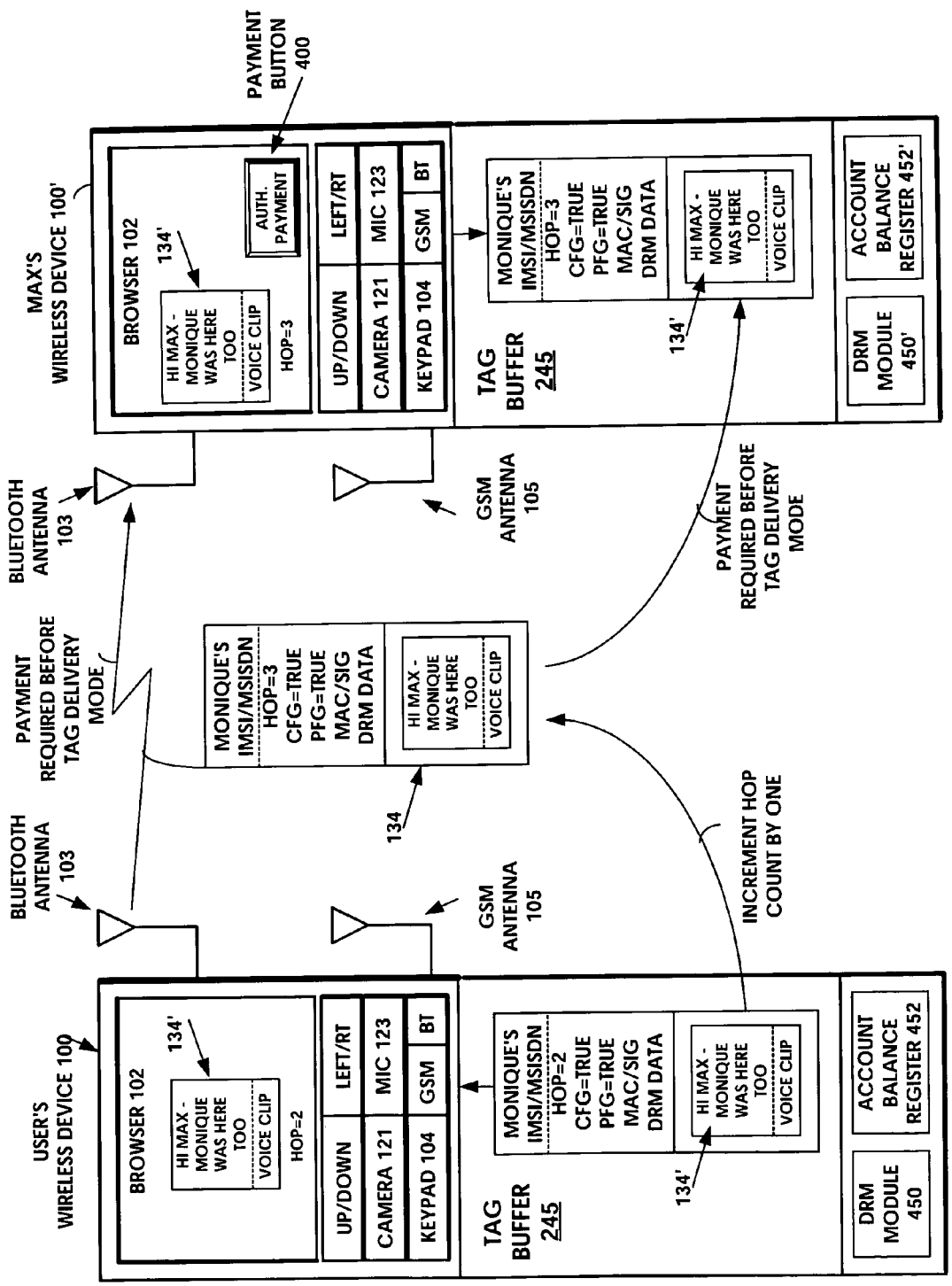
FIG. 12 illustrates another alternate embodiment of the invention, wherein payment is required from a requesting user's device 100', before a providing user's device 100 will transfer a tag over the Bluetooth link to the requesting user's device, according to an embodiment of the present invention. A digital rights management (DRM) module 450 in each mobile wireless device handles the exchange of charge authorization messages over the Bluetooth link between the mobile devices. The DRM module 450' in the requestor's device 100' sends a charge authorizing message to the provider's device 100. The provider's device 100 then sends the tag requested by the requestor's device 100', over the Bluetooth link.

FIG. 12 illustrates another alternate embodiment of the invention, wherein payment is required from Max's requesting device 100', before the providing user's device 100 will transfer a tag 134 to Max's requesting device 100'. The Bluetooth devices are in close proximity to one another and use the Bluetooth link to exchange tags. A digital rights management (DRM) module 450 in the user's mobile wireless device 100 and DRM module 450' in Max's mobile wireless device 100' handle the exchange of charge authorization messages over the Bluetooth link between the mobile devices. The DRM module 450' in Max's requestor's device 100' sends a charge authorizing message to the user's provider device 100. The user's provider device 100 then sends the tag 134 requested by Max's requestor's device 100', over the Bluetooth link. The digital rights management (DRM) module 450 in the user's wireless device 100 creates a secure environment in the memory 202 of the device 100, within which the data rights information associated with the tag 134 can be securely written in the "DRM Data" field of the tag 134. The DRM module 450 in the user's wireless device 100 enters the "Paid" status and additional data rights information in the "DRM Data" field of the tag 134. The multimedia content 134' can optionally be encrypted by the module 450. The user's wireless device 100 and then sends the tag 134 over the Bluetooth link in the tag delivery mode as requested by Max's wireless device 100'. The DRM module 450' in Max's device 100' creates a secure environment in the memory 202 of the device 100', within which the data rights associated with the tag 134 can be implemented. The DRM data in the tag 134 read by the DRM module 450', includes rules imposed by its author, Monique, regarding how the tag 134 may be distributed. The rules can include restrictions on copying, transfer, payment for copies, time span allowed for distribution, conditions for distribution of trial samples, allocation of royalties to middleman distributors, and the like. If multimedia content 134' was optionally encrypted by the user's wireless device 100, then the DRM module 450' in Max's device 100' decrypts the multimedia content 134' and permits its display on Max's screen 120.

Note that in the example of FIG. 12, it is assumed that there has never been an uploading of the tag 134 to a "wall server". This circumstance is indicated by the person-to-person flag (PFG), which has a value of "true" in the user's wireless device 100. The person-to-person flag (PFG) value of "true" verifies that the tag has only been transferred from person-to-person, and has not been downloaded from "the wall" server. The operation of tag delivery from the user's device 100 to Max's device 100' does not change the person-to-person flag (PFG), which has a value of "true" in the Max's wireless device 100'.

In another alternate embodiment of the invention, a tag can be automatically transferred from one Bluetooth device to another, whether stationary or mobile. The user's mobile Bluetooth device 100 can be programmed to listen or scan for any Bluetooth access point device 140 connected to a "wall" server 150. The SDP message exchange will tell the mobile device 100 of the availability of "the wall" services. When the user's mobile device 100 recognizes "a wall" server 150 within communications range, the user's mobile device 100 uploads the user's tag and automatically "paints the wall". The user's mobile device 100 can be programmed to automatically send a tag to any other Bluetooth device, including mobile devices such as 100'. A "tag worm" can be created, wherein the tag automatically propagates from user device 100 to user device 100', as users walk about. A user can prevent receiving unsolicited tags by turning off this feature.

In another alternate embodiment of the invention, a tag can be transferred from the user's mobile device 100 to a "wall" server 150 located in the user's home, as a "personal or family tag storage". The personal home "wall" server 150 is programmed to check the MSISDN identity of the mobile device 100 storing the tags. The user can store and retrieve his/her tags from the personal home "wall" server 150 without changing the hop counts in the tags. If an unauthorized person or device 100' were to attempt retrieving the user's tags, the personal home "wall" server 150 can prevent downloading the tags, or alternately it can increment the hop counts in copies of the tags that are downloaded.

In another alternate embodiment of the invention, "the wall" server 150 includes a queuing management system as one of the application programs 325 in FIG. 3. In this embodiment, the short-range wireless access point 140 for "the Wall" server 150 is located within the premises of a business. The queuing management system program of "the wall" server 150 performs the function of establishing a queue of customers waiting for service, such as in a bank or at a funfair or the like. The customer sends his/her Tag similar to Tag 138 shown in FIG. 1D (including his/her presence/ID-information) to "the Wall" server 150. "The wall" server 150 registers the customer as being on a virtual queuing line established by the queuing management system program. When the customer uploads his/her tag to the server 150, the server 150 can optionally return the tag 128 that is an advertisement message of the business, such as "Welcome to First National Bank. Open an interest-free checking account today." After registering, the customer can optionally browse other tags from "the Wall" server as shown in FIG. 1, while awaiting his/her turn within the premises of the business. Alternately, the customer can leave the premises of the business and when his/her turn is reached on the virtual queue, the queuing management system program of "the Wall" server 150 sends a notification message informing the customer that it is his/her turn at the front of the queue. The notification message can be sent over a cellular telephone network connected to "the wall" server 150, such as the network 116 in FIG. 8, to deliver an SMS message, similar to SMS message 408 shown in FIG. 8. Alternately, the notification message can be transmitted over a LAN such as the LAN 440 connected to "the wall" server 150 in FIG. 11, and delivered over a Bluetooth link to the customer's device 100 by a nearby Bluetooth access point connected to the LAN.

The resulting invention can be implemented in any suitable short range wireless system, including wireless personal area networks (PANs), such as Bluetooth networks, Radio Frequency Identification (RFID), and Infrared Data Protocol networks (IrDA), and wireless local area networks (LANs), such as the IEEE 802.11 wireless LANs and HIPERLAN networks.

Although specific embodiments of the invention have been disclosed, it will be understood by those having skill in the art that changes can be made to those specific embodiments without departing from the spirit and the scope of the invention.

What is claimed is:

1. A system, comprising:

a server programmed to store electronic tag data constructs in association with a virtual wall data construct stored in the server;

a short-range wireless access point connected to the server, the access point located at a place;

a mobile short-range wireless device programmed to enable its user to create an electronic tag data construct containing an identity of the user and associated with a multimedia message, the multimedia message including at least one of an audible data and a digital image file incorporated into the electronic tag data construct, wherein the device is programmed to send the electronic tag data construct over a short-range wireless link to the access point for association with the virtual wall data construct in the server to enable viewing the electronic tag by other users with short-range wireless viewing devices; and a long-range wireless circuit in the user's mobile short-range wireless device capable of sending multimedia messages, to forward content of the multimedia message over a long-range wireless network to long-range wireless receiving circuits.

2. The system of claim 1, which further comprises:

an editing program in the user's short-range wireless device to enable the user to write text, create an audio record or an image record and append it to the text, to create a multimedia message as the content of an electronic tag.

3. The system of claim 2, which further comprises:

said editing program incorporating the multimedia message into the electronic tag.

4. A system, comprising:

a server programmed to store electronic tag data constructs in association with a virtual wall data construct stored in the server;

a short-range wireless access point connected to the server, the access point located at a place;

a mobile short-range wireless device programmed to enable its user to create an electronic tag data construct containing an identity of the user and associated with a multimedia message, the multimedia message including at least one of an audible data and a digital image file incorporated into the electronic tag data construct;

wherein the device is programmed to send the electronic tag data construct over a short-range wireless link to the access point for association with the virtual wall data construct in the server to enable viewing the electronic tag by other users with short-range wireless viewing devices;

a long-range wireless circuit in the user's mobile short-range wireless device capable of sending multimedia messages to forward content of the multimedia message over a long-range wireless network to long-range wireless receiving circuits; and an editing program in the user's short-range wireless device to enable the user to write text, create an audio record or an image record and append it to the text, to create a multimedia message as the content of an electronic tag;

said editing program referencing the multimedia message by a pointer contained in the electronic tag.

5. A system, comprising:

a server programmed to store electronic tag data constructs in association with a virtual wall data construct stored in the server;

a short-range wireless access point connected to the server, the access point located at a place;

a mobile short-range wireless device programmed to enable its user to create an electronic tag data construct containing an identity of the user and associated with a multimedia message, the device programmed to send the electronic tag data construct over a short-range wireless link to the access point for association with the virtual wall data construct in the server to enable viewing the electronic tag by other users with short-range wireless viewing devices; and an editing program in the user's short-range wireless device to enable the user to write text, create an audio record or an image record and append it to the text, to create a multimedia message as the content of an electronic tag, said editing program uniquely associating in the electronic tag, the user's identity with the multimedia message by prohibiting alteration of the message content after the user completes its creation.

6. The system of claim 5, which further comprises:
said editing program setting a content-originator flag (CFG) value in the electronic tag to "false" during the period when the user is creating the message content.

7. The system of claim 6, which further comprises:
said editing program setting a content-originator flag (CFG) value in the electronic tag to "true" when the user completes editing the content of the message, thereby freezing the content to prevent subsequent viewers from authentically attributing any modification of the content to the original user.

8. The system of claim 7, which further comprises:
said editing program writing a hop count value of zero into the electronic tag when the original user has created the content.

9. The system of claim 8, which further comprises:
a tag uploading program in the user's short-range wireless device for incrementing the hop count value when the user uploads the electronic tag to the server and writes the tag in association with the virtual wall data construct.

10. The system of claim 9, which further comprises:
a tag downloading program in the server for incrementing the hop count in an electronic tag whenever a user downloads a copy of the tag from the server.

11. The system of claim 8, which further comprises:
a tag transmitting program in the in the user's short-range wireless device for incrementing the hop count by one when the user sends a copy of the electronic tag to another user's short range wireless device.

12. A system, comprising:
a server programmed to store electronic tag data constructs in association with a virtual wall data construct stored in the server;
a short-range wireless access point connected to the server, the access point located at a place;
a mobile short-range wireless device programmed to enable its user to create an electronic tag data construct containing an identity of the user and associated with a multimedia message, the device programmed to send the electronic tag data construct over a short-range wireless link to the access point for association with the virtual wall data construct in the server to enable viewing the electronic tag by other users with short-range wireless viewing devices; and
a cellular telephone circuit in the user's mobile short-range wireless device capable of sending multimedia messages, to forward content of the multimedia message over a telephone infrastructure network to other cellular telephones.

13. The system of claim 12, which further comprises:
said short-range wireless devices are implemented as wireless personal area network (PAN) devices.

14. The system of claim 12, which further comprises:
said short-range wireless devices are implemented as Bluetooth devices.

15. The system of claim 12, which further comprises:
said short-range wireless devices are implemented as IEEE 802.11 Wireless LAN devices.

16. The system of claim 12, which further comprises:
said short-range wireless devices are implemented as HIPERLAN devices.

17. The system of claim 12, which further comprises:
said multimedia message can be created or modified off line and then stored in the user's mobile device.

18. A system, comprising:
a server programmed to store electronic tag data constructs in association with a virtual wall data construct stored in the server;
a short-range wireless access point connected to the server, the access point located at a place;
a mobile short-range wireless device programmed to enable its user to create an electronic tag data construct containing an identity of the user and associated with a multimedia message, the multimedia message including at least one of an audible data and a digital image file incorporated into the electronic tag data construct;
wherein the device is programmed to send the electronic tag data construct over a short-range wireless link to the access point for association with the virtual wall data construct in the server to enable viewing the electronic tag by other users with short-range wireless viewing devices;
a long-range wireless circuit in the user's mobile short-range wireless device capable of sending multimedia messages, to forward content of the multimedia message over a long-range wireless network to long-range wireless receiving circuits; and
an editing program in the user's short-range wireless device to enable the user to write text, create an audio record or an image record and append it to the text, to create a multimedia message as the content of an electronic tag;
said editing program uniquely associating the user's identity with the multimedia message, as an originating user;
said editing program setting a content-originator flag (CFG) value in the tag to "false" during a period when the user is creating or modifying the message content;
said editing program setting the content-originator flag (CFG) value to "true", thereby making permanent the association of the message content with the user's identity, when the user completes editing the message;
whereby subsequent viewers of the content can make a copy of the content, but they cannot authentically attribute the modified copy to the originating user.

19. The system of claim 12, which further comprises:
an editing program in the user's short-range wireless device to enable the user to write text, create an audio record or an image record and append it to the text, to create a multimedia message as the content of an electronic tag; and
said editing program including the user's international mobile subscriber identity (IMSI) or mobile station ISDN number (MSISDN) in the tag.

20. The system of claim 12, which further comprises:
said server is connected to a Bluetooth access point located at a frequent gathering place, such as a famous landmark, a shopping center, a school, or a home.

21. The system of claim 12, which further comprises:
said mobile short-range wireless device is programmed to enable the user to create tags that contain multimedia messages that are typically aphorisms, notes, jokes, and the like.

22. The system of claim 21, which further comprises:
said multimedia messages may be previously prepared or spontaneously create.

23. A system, comprising:
a server programmed to store electronic tag data constructs in association with a virtual wall data construct stored in the server;
a short-range wireless access point connected to the server, the access point located at a place;
a mobile short-range wireless device programmed to enable its user to create an electronic tag data construct containing an identity of the user and associated with a multimedia message, the multimedia message including at least one of an audible data and a digital image file incorporated into the electronic tag data construct;
wherein the device is programmed to send the electronic tag data construct over a short-range wireless link to the access point for association with the virtual wall data construct in the server to enable viewing the electronic tag by other users with short-range wireless viewing devices;
a long-range wireless circuit in the user's mobile short-range wireless device capable of sending multimedia messages, to forward content of the multimedia message over a long-range wireless network to long-range wireless receiving circuits; and
an editing program in the user's short-range wireless device to enable the user to write text, create an audio record or an image record and append it to the text, to create a multimedia message as the content of an electronic tag;
said editing program writing a hop count value of zero into the tag when the original user has created the content in the mobile device;
said mobile device incrementing the hop count if the user uploads the tag to the server;
said server incrementing the hop count when a later user downloads a copy of the tag from the server.

24. The system of claim 23, which further comprises:
said mobile device incrementing the hop count if the user sends a copy of the tag to another user.

25. A system, comprising:
a server programmed to store electronic tag data constructs in association with a virtual wall data construct stored in the server;
a short-range wireless access point connected to the server, the access point located at a place;
a mobile short-range wireless device programmed to enable its user to create an electronic tag data construct containing an identity of the user and associated with a multimedia message, the multimedia message including at least one of an audible data and a digital image file incorporated into the electronic tag data construct;
wherein the device is programmed to send the electronic tag data construct over a short-range wireless link to the access point for association with the virtual wall data construct in the server to enable viewing the electronic tag by other users with short-range wireless viewing devices;
a long-range wireless circuit in the user's mobile short-range wireless device capable of sending multimedia messages, to forward content of the multimedia message over a long-range wireless network to long-range wireless receiving circuits; and
an editing program in the user's short-range wireless device to enable the user to write text, create an audio record or an image record and append it to the text, to create a multimedia message as the content of an electronic tag;
said editing program writing a person-to-person flag (PFG) in the tag, indicating that the tag has been only transferred from person to person and has not been downloaded from the server.

26. A system, comprising:
a server programmed to store electronic tag data constructs in association with a virtual wall data construct stored in the server;
a short-range wireless access point connected to the server, the access point located at a place;
a mobile short-range wireless device programmed to enable its user to create an electronic tag data construct containing an identity of the user and associated with a multimedia message, the multimedia message including at least one of an audible data and a digital image file incorporated into the electronic tag data construct;
wherein the device is programmed to send the electronic tag data construct over a short-range wireless link to the access point for association with the virtual wall data construct in the server to enable viewing the electronic tag by other users with short-range wireless viewing devices;
a long-range wireless circuit in the user's mobile short-range wireless device capable of sending multimedia messages, to forward content of the multimedia message over a long-range wireless network to long-range wireless receiving circuits; and
an editing program in the user's short-range wireless device to enable the user to write text, create an audio record or an image record and append it to the text, to create a multimedia message as the content of an electronic tag;
said editing program freezing the content of the tag so that later viewers cannot attribute a modification of the content to the original user.

27. The system of claim 26, which further comprises:
said editing program appending to the tag a message authentication code (MAC) hash value on the content of the tag and a digital signature of the originating party.

28. A system, comprising:
a server programmed to store electronic tag data constructs in association with a virtual wall data construct stored in the server;
a short-range wireless access point connected to the server, the access point located at a place;
a mobile short-range wireless device programmed to enable its user to create an electronic tag data construct containing an identity of the user and associated with a multimedia message, the multimedia message including at least one of an audible data and a digital image file incorporated into the electronic tag data construct;
wherein the device is programmed to send the electronic tag data construct over a short-range wireless link to the access point for association with the virtual wall data construct in the server to enable viewing the electronic tag by other users with short-range wireless viewing devices;
a long-range wireless circuit in the user's mobile short-range wireless device capable of sending multimedia messages, to forward content of the multimedia message over a long-range wireless network to long-range wireless receiving circuits; and a cellular telephone coupled to said mobile device, to transmit the multimedia content of a tag over a cellular telephone network to cellular telephones capable of receiving multimedia files.

29. A system, comprising:

a server programmed to store electronic tag data constructs in association with a virtual wall data construct stored in the server;

a short-range wireless access point connected to the server, the access point located at a place;

a mobile short-range wireless device programmed to enable its user to create an electronic tag data construct containing an identity of the user and associated with a multimedia message, the multimedia message including at least one of an audible data and a digital image file incorporated into the electronic tag data construct;

wherein the device is programmed to send the electronic tag data construct over a short-range wireless link to the access point for association with the virtual wall data construct in the server to enable viewing the electronic tag by other users with short-range wireless viewing devices;

a long-range wireless circuit in the user's mobile short-range wireless device capable of sending multimedia messages, to forward content of the multimedia message over a long-range wireless network to long-range wireless receiving circuits; and said mobile device sends a tag to recipient's mobile device in a "tag delivery" mode, wherein the sending device transfers a copy of the tag in the sender's device, causing the hop count to be incremented by one in the copy of the tag received by the recipient's mobile device.

30. A system, comprising:

a server programmed to store electronic tag data constructs in association with a virtual wall data construct stored in the server;

a short-range wireless access point connected to the server, the access point located at a place;

a mobile short-range wireless device programmed to enable its user to create an electronic tag data construct containing an identity of the user and associated with a multimedia message, the multimedia message including at least one of an audible data and a digital image file incorporated into the electronic tag data construct;

wherein the device is programmed to send the electronic tag data construct over a short-range wireless link to the access point for association with the virtual wall data construct in the server to enable viewing the electronic tag by other users with short-range wireless viewing devices;

a long-range wireless circuit in the user's mobile short-range wireless device capable of sending multimedia messages, to forward content of the multimedia message over a long-range wireless network to long-range wireless receiving circuits; and said mobile device sends a tag to recipient's mobile device in a "tag give-away" mode, wherein the sending device transfers the tag currently in the sender's device, causing the hop count to remain unchanged in the tag received by the recipient and the sender's device keeps a copy of the tag, and the copy in the sender's device has its ho count incremented by one.

31. A system, comprising:

a server programmed to store electronic tag data constructs in association with a virtual wall data construct stored in the server;

a short-range wireless access point connected to the server, the access point located at a place;

a mobile short-range wireless device programmed to enable its user to create an electronic tag data construct containing an identity of the user and associated with a multimedia message, the multimedia message including at least one of an audible data and a digital image file incorporated into the electronic tag data construct;

wherein the device is programmed to send the electronic tag data construct over a short-range wireless link to the access point for association with the virtual wall data construct in the server to enable viewing the electronic tag by other users with short-range wireless viewing devices;

a long-range wireless circuit in the user's mobile short-range wireless device capable of sending multimedia messages, to forward content of the multimedia message over a long-range wireless network to long-range wireless receiving circuits; and said mobile device automatically transferring a tag to another mobile device when they are within communications range.

32. The system of claim 12, which further comprises:

said mobile device automatically transferring a tag to the server when they are within communications range.

33. A system, comprising:

a server programmed to store electronic tag data constructs in association with a virtual wall data construct stored in the server;

a short-range wireless access point connected to the server, the access point located at a place;

a mobile short-range wireless device programmed to enable its user to create an electronic tag data construct containing an identity of the user and associated with a multimedia message, the multimedia message including at least one of an audible data and a digital image file incorporated into the electronic tag data construct;

wherein the device is programmed to send the electronic tag data construct over a short-range wireless link to the access point for association with the virtual wall data construct in the server to enable viewing the electronic tag by other users with short-range wireless viewing devices;

a long-range wireless circuit in the user's mobile short-range wireless device capable of sending multimedia messages, to forward content of the multimedia message over a long-range wireless network to long-range wireless receiving circuits; and said mobile device automatically transferring a tag to another mobile device when they are within communications range, as a "tag worm", wherein the tag automatically propagates from one mobile device to another mobile device.

34. A system, comprising:

a server programmed to store electronic tag data constructs in association with a virtual wall data construct stored in the server;

a short-range wireless access point connected to the server, the access point located at a place;

a mobile short-range wireless device programmed to enable its user to create an electronic tag data construct containing an identity of the user and associated with a multimedia message, the multimedia message including at least one of an audible data and a digital image file incorporated into the electronic tag data construct;

wherein the device is programmed to send the electronic tag data construct over a short-range wireless link to the access point for association with the virtual wall data construct in the server to enable viewing the electronic tag by other users with short-range wireless viewing devices;

a long-range wireless circuit in the user's mobile short-range wireless device capable of sending multimedia messages, to forward content of the multimedia message over a long-range wireless network to long-range wireless receiving circuits; and said server being located in the user's home, as a "personal or family tag storage".

35. The system of claim 34, which further comprises:

said short-range wireless devices are implemented as wireless personal area network (PAN) devices.

36. The system of claim 34, which further comprises:

said short-range wireless devices are implemented as Bluetooth devices.

37. A server for a short-range wireless network, comprising:

a processor;

a memory coupled to said processor storing a computer program to be executed by said processor to perform the steps of:

storing electronic tag data constructs in association with a virtual wall data construct stored in the server coupled to a short-range wireless access point located at a place;

receiving an electronic tag data construct containing an identity of the user and associated with a multimedia message from a mobile short-range wireless device programmed to enable its user to create the electronic tag data construct; and associating the received electronic tag data construct with the virtual wall data construct in the server to enable viewing the electronic tag by other users with short-range wireless viewing devices;

said wireless device including circuits for forwarding content of the multimedia message over a long-range wireless network to long-range wireless receiving circuits;

wherein the multimedia message includes at least one of an audible data and a digital image file incorporated into the electronic tag data construct.

38. A server coupled to a short-range wireless network, comprising:

a processor;

a memory coupled to said processor storing a computer program to be executed by said processor to perform the steps of;

storing electronic tag data constructs in association with a virtual wall data construct stored in the server connected to a short-range wireless access point located at a place;

receiving an electronic tag data construct containing an identity of the user and associated with a multimedia message from a mobile short-range wireless device programmed to enable its user to create the electronic tag data construct; and associating the received electronic tag data construct with the virtual wall data construct in the server to enable viewing the electronic tag by other users with short-range wireless viewing devices;

said wireless device including circuits for forwarding content of the multimedia message over a telephone infrastructure network to other cellular telephones.

39. The server of claim 38, which further comprises:

said wireless device enabling the user to write text, create a voice clip and append it to the text, or take a digital picture and append it to the text using an editing program, to create a multimedia message as the content of an electronic tag.

40. The server of claim 39, which further comprises:

said editing program incorporating the multimedia message into the electronic tag.

41. The server of claim 39, which further comprises:

said editing program referencing the multimedia message by a pointer contained in the electronic tag.

42. A program product for a server coupled to a short-range wireless network, comprising:

a computer readable medium containing program code;

program code in said computer readable medium for storing electronic tag data constructs in association with a virtual wall data construct stored in a server connected to a short-range wireless access point located at a place;

program code in said computer readable medium for receiving an electronic tag data construct containing an identity of the user and associated with a multimedia message from a mobile short-range wireless device programmed to enable its user to create the electronic tag data construct;

program code in said computer readable medium for associating the received electronic tag data construct with the virtual wall data construct in the server to enable viewing the electronic tag by other users with short-range wireless viewing devices;

said mobile short-range wireless device programmed to enable the user to write text, create a voice clip and append it to the text, or take a digital picture and append it to the text, to create a multimedia message as the content of an electronic tag; and said mobile short-range wireless device programmed to uniquely associate in the electronic tag, the user's identity with the multimedia message by prohibiting alteration of the message content after the user completes its creation.

43. The program product of claim 42, which further comprises:

said editing program setting a content-originator flag (CFG) value in the electronic tag to "false" during the period when the user is creating the message content.

44. The program product of claim 43, which further comprises:

said editing program setting a content-originator flag (CFG) value in the electronic tag to "true" when the user completes editing the content of the message, thereby freezing the content to prevent subsequent viewers from authentically attributing any modification of the content to the original user.

45. The program product of claim 44, which further comprises:

said editing program writing a hop count value of zero into the electronic tag when the original user has created the content.

46. The program product of claim 45, which further comprises:

said mobile short-range wireless device programmed to increment the hop count value when the user uploads the electronic tag to the server and writes the tag in association with the virtual wall data construct.

47. The program product of claim 46, which further comprises:
said mobile short-range wireless device programmed to increment the hop count in an electronic tag whenever a user downloads a copy of the tag from the server.

48. The program product of claim 47, which further comprises:
said mobile short-range wireless device programmed to increment the hop count by one when the user sends a copy of the electronic tag to another user's short range wireless device.

49. A method for a short-range wireless network, comprising:
storing electronic tag data constructs in association with a virtual wall data construct stored in a server connected to a short-range wireless access point located at a place;
receiving an electronic tag data construct containing an identity of the user and associated with a multimedia message from a mobile short-range wireless device programmed to enable its user to create the electronic tag data construct;
associating the received electronic tag data construct with the virtual wall data construct in the server to enable viewing the electronic tag by other users with short-range wireless viewing devices;
enabling the user to write text, create a voice clip and append it to the text, or take a digital picture and append it to the text, to create a multimedia message as the content of an electronic tag; and
writing a person-to-person flag (PFG) in the tag, indicating that the tag has been only transferred from person to person and has not been downloaded from the server.

50. A mobile short-range wireless device, comprising:
a processor; and
a memory coupled to the processor, programmed to enable creating an electronic tag data construct containing an identity of a user and associated with a multimedia message, the multimedia message including at least one of an audible data and a digital image file incorporated into the electronic tag data construct, wherein the memory is further programmed to send the electronic tag data construct over a short-range wireless link to an access point for association with a virtual wall data construct in a server to enable viewing the electronic tag by other users with short-range wireless viewing devices, and wherein the memory is further programmed to forward content of the multimedia message over a long-range wireless network to long-range wireless receiving circuits.

51. A mobile short-range wireless device, comprising:
a processor;
a memory coupled to the processor, programmed to enable creating an electronic tag data construct containing an identity of a user and associated with a multimedia message, the memory further programmed to send the electronic tag data construct over a short-range wireless link to an access point for association with a virtual wall data construct in a server to enable viewing the electronic tag by other users with short-range wireless viewing devices; and
a cellular telephone circuit in the user's mobile short-range wireless device capable of sending multimedia messages, to forward content of the multimedia message over a telephone infrastructure network to other cellular telephones.

52. The device of claim 51, which further comprises:
an editing program in the user's short-range wireless device to enable the user to write text, create an audio record or an image record and append it to the text, to create a multimedia message as the content of an electronic tag.

53. The device of claim 52, which further comprises:
said editing program incorporating the multimedia message into the electronic tag.

54. The device of claim 52, which further comprises:
said editing program referencing the multimedia message by a pointer contained in the electronic tag.

55. A mobile short-range wireless device, comprising:
a processor;
a memory coupled to the processor, programmed to enable creating an electronic tag data construct containing an identity of a user and associated with a multimedia message, the memory further programmed to send the electronic tag data construct over a short-range wireless link to an access point for association with a virtual wall data construct in a server to enable viewing the electronic tag by other users with short-range wireless viewing devices;
an editing program in the user's short-range wireless device to enable the user to write text, create an audio record or an image record and append it to the text, to create a multimedia message as the content of an electronic tag;
said editing program uniquely associating in the electronic tag, the user's identity with the multimedia message by prohibiting alteration of the message content after the user completes its creation.

56. The device of claim 55, which further comprises:
said editing program setting a content-originator flag (CFG) value in the electronic tag to "false" during the period when the user is creating the message content.

57. The device of claim 56, which further comprises:
said editing program setting a content-originator flag (CFG) value in the electronic tag to "true" when the user completes editing the content of the message, thereby freezing the content to prevent subsequent viewers from authentically attributing any modification of the content to the original user.

58. The device of claim 57, which further comprises:
said editing program writing a hop count value of zero into the electronic tag when the original user has created the content.

59. The device of claim 58, which further comprises:
a tag uploading program in the user's short-range wireless device for incrementing the hop count value when the user uploads the electronic tag to the server and writes the tag in association with the virtual wall data construct.

60. The device of claim 59, which further comprises:
a tag downloading program in the server for incrementing the hop count in an electronic tag whenever a user downloads a copy of the tag from the server.

61. The device of claim 58, which further comprises:
a tag transmitting program in the in the user's short-range wireless device for incrementing the hop count by one when the user sends a copy of the electronic tag to another user's short range wireless device.

62. The device of claim 51, which further comprises:
said short-range wireless devices are implemented as wireless personal area network (PAN) devices.

63. The device of claim 51, which further comprises:
said short-range wireless devices are implemented as Bluetooth devices.

64. The device of claim 51, which further comprises:
said short-range wireless devices are implemented as IEEE 802.11 Wireless LAN devices.

65. The device of claim 51, which further comprises:
said short-range wireless devices are implemented as HIPERLAN devices.

66. A program product for use in a short-range wireless communications network and in a long-range wireless communications network, for communicating a multimedia signal, comprising:
a computer readable medium containing program code;
program code in said computer readable medium for generating a short-range wireless tag signal for transmission in said short-range wireless network;
program code in said computer readable medium for generating a header signal in said tag signal, including an identity of a user;
program code in said computer readable medium for generating a multimedia message signal in said tag signal;
program code in said computer readable medium for sending said short-range wireless tag signal in said short-range wireless network; and
program code in said computer readable medium for extracting said multimedia message signal from said short-range wireless tag signal to enable sending said multimedia message signal in said long-range wireless communications network;
wherein said header signal prohibits alteration of the message content after a user completes its creation.

67. The program product of claim 66, further comprising:
said short-range wireless tag signal associating with a virtual wall data construct in a server receiving said short-range wireless tag signal;
whereby said short-range wireless tag signal can be viewed by users with short-range wireless viewing devices.

68. The program product of claim 66, further comprising:
said multimedia message signal including text, an audio record or an image record append to the text, creating a multimedia message as the content of the electronic tag signal.

69. The program product of claim 66, further comprising:
said header signal including a content-originator flag (CFG) value of "false" during a period when a user is creating the message content.

70. The program product of claim 69, further comprising:
said header signal including a content-originator flag (CFG) value of "true" when the user completes editing the content of the message, thereby freezing the content to prevent subsequent viewers from authentically attributing any modification of the content to the original user.

71. A method for use in a short-range wireless communications network and in a long-range wireless communications network, for communicating a multimedia signal, comprising:
generating a short-range wireless tag signal for transmission in said short-range wireless network;
generating a header signal in said tag signal, including an identity of a user;
generating a multimedia message signal in said tag signal;
sending said short-range wireless tag signal in said short-range wireless network; and
extracting said multimedia message signal from said short-range wireless tag signal to enable sending said multimedia message signal in said long-range wireless communications network;
wherein said header signal includes a hop count value of zero when an original user has created the content.

72. A method for use in a short-range wireless communications network and in a long-range wireless communications network, for communicating a multimedia signal, comprising:
generating a short-range wireless tag signal for transmission in said short-range wireless network;
generating a header signal in said tag signal, including an identity of a user;
generating a multimedia message signal in said tag signal;
sending said short-range wireless tag signal in said short-range wireless network; and
extracting said multimedia message signal from said short-range wireless tag signal to enable sending said multimedia message signal in said long-range wireless communications network;
wherein said header signal includes a hop count value greater than zero when a user uploads the electronic tag to a server and writes the tag in association with a virtual wall data construct.

73. The method of claim 72, further comprising:
said header signal including an incremented hop count value whenever a user downloads a copy of the tag from the server.

74. A method for use in a short-range wireless communications network and in a long-range wireless communications network, for communicating a multimedia signal, comprising:
generating a short-range wireless tag signal for transmission in said short-range wireless network;
generating a header signal in said tag signal, including an identity of a user;
generating a multimedia message signal in said tag signal;
sending said short-range wireless tag signal in said short-range wireless network; and
extracting said multimedia message signal from said short-range wireless tag signal to enable sending said multimedia message signal in said long-range wireless communications network;
wherein said header signal includes a hop count value greater than zero when a user sends a copy of the electronic tag to another user's short range wireless device.

* * * * *